(12) United States Patent
Stevens et al.

(10) Patent No.: US 12,247,136 B2
(45) Date of Patent: Mar. 11, 2025

(54) POLYMER DISPERSION HAVING IMPROVED ADHESION AND WETTABILITY AND METHODS FOR THE SAME

(71) Applicant: The Boeing Company, Chicago, IL (US)

(72) Inventors: Bart Stevens, Summerville, SC (US); Kay Y. Blohowiak, Issaquah, WA (US); Christopher Garnier, North Charleston, SC (US)

(73) Assignee: THE BOEING COMPANY, Arlington, VA (US)

( * ) Notice: Subject to any disclaimer, the term of this patent is extended or adjusted under 35 U.S.C. 154(b) by 685 days.

(21) Appl. No.: 17/450,201

(22) Filed: Oct. 7, 2021

(65) Prior Publication Data
US 2023/0114159 A1 Apr. 13, 2023

(51) Int. Cl.
| | |
|---|---|
| C09D 5/14 | (2006.01) |
| A01N 25/10 | (2006.01) |
| A01N 59/16 | (2006.01) |
| A01P 1/00 | (2006.01) |
| C09D 5/22 | (2006.01) |
| C09D 7/45 | (2018.01) |
| C09D 183/06 | (2006.01) |
| C09D 183/08 | (2006.01) |

(52) U.S. Cl.
CPC ............ *C09D 5/14* (2013.01); *A01N 25/10* (2013.01); *A01N 59/16* (2013.01); *A01P 1/00* (2021.08); *C09D 5/22* (2013.01); *C09D 7/45* (2018.01); *C09D 183/06* (2013.01); *C09D 183/08* (2013.01)

(58) Field of Classification Search
CPC .......... C09D 5/14; C09D 5/22; C09D 183/06; C09D 183/08; C09D 7/45
USPC .......................................................... 523/122
See application file for complete search history.

(56) References Cited

U.S. PATENT DOCUMENTS

| | | | |
|---|---|---|---|
| 2018/0028431 A1* | 2/2018 | Chiattello | ............... A61K 8/29 |
| 2018/0362462 A1 | 12/2018 | Monteiro et al. | |
| 2020/0033993 A1 | 2/2020 | Monteiro et al. | |
| 2021/0017342 A1 | 1/2021 | Dustin et al. | |

FOREIGN PATENT DOCUMENTS

WO 2021/050355 A1 3/2021

OTHER PUBLICATIONS

Requisition by the Examiner issued Feb. 23, 2024 in corresponding Canadian Application No. 3,170,328, 6 pages.
Swarup et al., "A Survey of Surfactants in Coatings Technology," Progress in Organic Coatings, 23 (1993) 1-22.
Walker, "Organo Silanes as Adhesion Promoters for Organic Coatings," Journal of Coatings Technology, vol. 52, No. 670, Nov. 1980, pp. 49-61.
Extended European Search Report issued Dec. 22, 2022 in corresponding European Application No. 22186979.5.

\* cited by examiner

*Primary Examiner* — Deve V Hall
(74) *Attorney, Agent, or Firm* — MH2 Technology Law Group LLP

(57) ABSTRACT

An antimicrobial coating composition is disclosed. The antimicrobial coating composition also includes a polymer having a plurality of alkene units and a plurality of macroCTA polymer units. The composition also includes one or more reactive silanes, one or more wetting agents, and one or more solvents. A method for applying an antimicrobial coating composition is disclosed. The method for applying an antimicrobial coating composition may include contacting a polymer, one or more wetting agents, one or more solvents, and one or more reactive silanes with one another to prepare an antimicrobial coating composition, homogenizing the antimicrobial coating composition, applying the antimicrobial coating composition to a substrate, and allowing the antimicrobial coating composition to dry at ambient conditions.

20 Claims, 5 Drawing Sheets

Specification includes a Sequence Listing.

POLYMER DISPERSION HAVING IMPROVED ADHESION AND WETTABILITY AND METHODS FOR THE SAME

SEQUENCE LISTING

The instant application contains a Sequence Listing which has been submitted electronically in ASCII format and is hereby incorporated by reference in its entirety. Said ASCII copy, created on Oct. 22, 2024, is named 0192_0370_SL.txt and is 10,047 bytes in size.

TECHNICAL FIELD

The present disclosure generally relates to the field of antimicrobial coatings. More particularly, the present disclosure relates to compositions for antimicrobial coatings and methods for making the same.

BACKGROUND

Pandemics by viruses (e.g., SARS, SARS-CoV-2, Swine Flu, Ebola) have major impact to the global economy by reducing airline passenger traffic. Seasonal flu and aircraft cabin sterility are also ongoing concerns by airline passengers. Similarly, the space transportation and habitation industry are concerned with preventing the transmission of microbes. Travelers in space may become more easily immunosuppressed with a greater susceptibility to disease transmission by microbes. In addition, microbes may replicate more and become more virulent in a zero-gravity environment or a radiation shielded environment.

Preventing disease transmission on aircrafts and spacecrafts has conventionally focused on improvements of the air filtration systems, such as HEPA air filter systems. Replacing and maintaining HEPA filters may be costly or impractical, such as replacing and maintaining HEPA filters in space. Moreover, such systems may be ineffective to reduce or stop the transmission of microbes from surfaces. Bacteria and viruses can linger on surfaces for days and even up to a week.

Therefore, there is a need for well-dispersed, antimicrobial surface coatings having improved surface adhesion that are effective on reducing the transmission of microbes.

SUMMARY

The following presents a simplified summary in order to provide a basic understanding of some aspects of the present teachings. This summary is not an extensive overview, nor is it intended to identify key or critical elements of the present teachings, nor to delineate the scope of the disclosure. Rather, its primary purpose is merely to present one or more concepts in simplified form as a prelude to the detailed description presented later.

Examples of the disclosure provide an antimicrobial coating composition. The antimicrobial coating composition also includes a polymer having a plurality of alkene units and a plurality of macroCTA polymer units. The composition also includes one or more reactive silanes, one or more wetting agents, and one or more solvents.

The antimicrobial coating composition includes where the polymer is present in an amount of from about 0.05% to about 10% by total weight of the antimicrobial coating composition. The one or more reactive silanes may be present in an amount of from about 0.1% to about 10% by total weight of the antimicrobial coating composition. The one or more reactive silanes may include a glycidoxy functional group. The one or more reactive silanes may include glycidoxypropyltrimethoxysilane. The one or more reactive silanes may include an amine functional group. The one or more wetting agents may include a surfactant, a co-solvent or a combination thereof. The antimicrobial coating composition may further include a surfactant that is present in an amount of from about 0.1% to about 2% by total weight of the antimicrobial coating composition. The antimicrobial coating composition may further include a co-solvent that is present in an amount of from about 0.5% to about 20% by total weight of the antimicrobial coating composition. The antimicrobial coating composition may include one or more catalysts. The one or more catalysts may include acetic acid. The one or more catalysts may include ammonium hydroxide. The antimicrobial coating composition may include one or more functional additives. The functional additive may include a fluorescent marker. The solvent used in the antimicrobial coating composition may include water.

Examples of the disclosure provide a method for applying the antimicrobial coating composition which includes contacting the one or more solvents and the one or more reactive silanes with one another to prepare a first part of the antimicrobial coating composition, contacting the one or more solvents, the polymer, and the one or more wetting agents with one another, to prepare a second part of the antimicrobial coating composition, applying the first part of the antimicrobial coating composition to a substrate, evaporating the one or more solvents from the first part of the antimicrobial coating composition, and applying the second part of the antimicrobial coating composition over the first part of the antimicrobial coating composition.

Examples of the disclosure provide an antimicrobial coating composition. The antimicrobial coating composition includes a polymer having a plurality of alkene units and a plurality of macroCTA polymer units. The antimicrobial coating composition also includes one or more reactive silanes, which may include a glycidoxypropyltrimethoxysilane. The antimicrobial coating composition also includes ammonium hydroxide, one or more wetting agents, and water.

A method for applying an antimicrobial coating composition is disclosed. The method for applying an antimicrobial coating composition includes contacting a polymer, one or more wetting agents, one or more solvents, and one or more reactive silanes with one another to prepare an antimicrobial coating composition, homogenizing the antimicrobial coating composition, applying the antimicrobial coating composition to a substrate, and allowing the antimicrobial coating composition to dry at ambient conditions.

The method for applying an antimicrobial coating composition may include pausing after homogenizing the antimicrobial coating composition to allow the antimicrobial coating composition time to pre-react in solution. The substrate the antimicrobial coating composition is applied to may be metal, alloy, polymer, or combination thereof.

The features, functions, and advantages that have been discussed can be achieved independently in various implementations or can be combined in yet other implementations further details of which can be seen with reference to the following description.

BRIEF DESCRIPTION OF THE DRAWINGS

The accompanying drawings, which are incorporated in and constitute a part of this specification, illustrate embodiments of the present teachings and together with the description, serve to explain the principles of the disclosure. In the figures.

Figure 1:
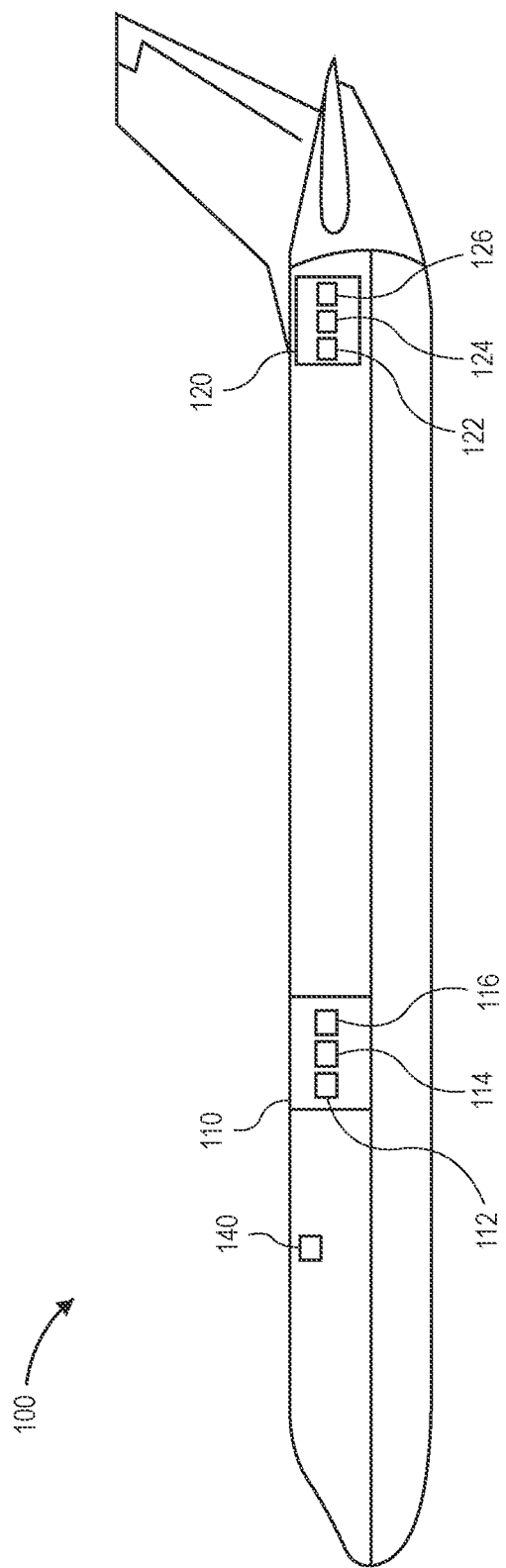
FIG. 1 illustrates a schematic view of a vehicle, in accordance with the present disclosure.

It should be noted that some details of the figures have been simplified and are drawn to facilitate understanding of the present teachings rather than to maintain strict structural accuracy, detail, and scale.

DETAILED DESCRIPTION

During decontamination and disinfecting procedures for public high-touch areas in public establishments, and also in commercial and military aircraft, public vehicles, and other public means of transportation, antimicrobial procedures and/or treatments may be used to limit the spread of microbes that lead to viral transmission. These may also be particularly valuable in space travel. Currently known methods of reducing airborne microbes include the replacing and maintenance of HEPA filters, which may be costly or impractical, particularly regarding replacing and maintaining HEPA filters in space. These systems may not be effective in the reduction or prevention transmission of microbes from surfaces. As bacteria and viruses can linger on surfaces for days and even up to a week, known antimicrobial polymers and antimicrobial polymer-based coatings may prove more effective if formulated into a useful coating that can be applied to surfaces with good coverage and without loss of adhesion over time. In antimicrobial polymers that are available as a dry powder, for example, the form of the antimicrobial polymer may not readily lend itself to application to surfaces. If such an antimicrobial polymer were cast, sprayed, or otherwise applied from a solution or dispersion in a solvent without additional additives, this antimicrobial polymer would not, in embodiments, wet out onto the surface to which it is applied, or adhere to such surfaces.

Exemplary examples of the present disclosure include formulations of antimicrobial polymers incorporating additives or chemicals that work with the antimicrobial polymer in order for it to more uniformly cover and adhere to surfaces. Such coating formulations, fabrication methods, and application methods as described herein include a dry polymer powder, a powder developed by and available from the University of Queensland under a present product code designation of "P13." Exemplary examples of the formulation of the present disclosure may further include one or more adhesion promoters, or reactive silanes, such as (3-Glycidyloxypropyl)-trimethoxysilane, also referred to as GPTMS, GLYMO, GTMS, and the like). Exemplary formulations may include a dry antimicrobial powder having improved durability and adhesion-to-surface properties. Additional additives in exemplary examples of antimicrobial coating formulations may be used with catalysts, such as acetic acid, ammonium hydroxide, and the like, to improve hydrolysis rate, or can alternatively be used without catalysts. Additional adhesion promoters may include reactive silanes similar to GPTMS such as methoxy-substituted versions of GPTMS, as well as silanes with functionality other than glycidyl ethers such as aminopropyl trimethoxysilane and its derivatives. Wetting agents, which for the purposes of this disclosure are intended to include surfactants and co-solvents, may be incorporated into the antimicrobial coating formulation, as well as solvents, for example, water. Exemplary examples of the antimicrobial coating formulation have improved, uniform coverage and improved adhesion. The antimicrobial polymer may have a unique fluorescent marker attached to it, which allows it to be detected with a UV light source to evaluate presence as well as coverage of the antimicrobial coating.

As described herein, an antimicrobial polymer coating formulation comprising an antibacterial or antimicrobial polymer, which in some contexts may be referred to as a "nanoworm" or a "plurality of nanoworms" can be applied to any object. For example, an antimicrobial polymer coating formulation comprising a plurality of nanoworms or an antimicrobial polymer component can be applied over a substrate in an aircraft to provide antimicrobial properties to a surface of the aircraft. It should also be understood that the compositions and embodiments disclosed herein may also be considered as antibacterial, and have effective properties in removing, inactivating, or killing viruses, yeast, fungi, other pathogens, or combinations thereof. The substrate in the cabin of a commercial airplane, for example, can be a tray table, a headrest, a seatback pocket, a seatback top, a seat armrest, a seat; bathroom surfaces (such as a bathroom door lock or handle, a sink, a toilet), an in-flight magazine, a safety card, an overhead air vent, a seatbelt buckle, a window shade, a widow, an entertainment screen, an interior wall, a floor, a pillow, a blanket, and other surfaces of an aircraft which will be described herein. An antimicrobial polymer coating formulation can alternatively be applied over a substrate in a hospital to provide antimicrobial properties to a surface of the hospital. In such a hospital setting, the substrate can be a bed, a chair, a table, a tray or tray table, a counter, an interior wall, a floor, a door handle, a bathroom surface as described above, and other surfaces of a hospital. An antimicrobial polymer coating formulation can alternatively be applied over a substrate in a transportation vehicle, such as in buses, trains, subway cars, taxis, cars, ferries, boats, cruise ships, and other transportation vehicles, to provide antimicrobial properties to a surface of the public transportation vehicle. The substrate in such a transportation vehicle can be a seat, a handrail, a door (door, lock, handle or the like), bathroom surfaces as described above, and other surfaces of a transportation vehicle. An antimicrobial polymer coating formulation can alternatively be applied over a substrate in surfaces of a building, such as an office building, a school building, a store building, a restaurant building, a college building, a daycare building, other buildings, to provide antimicrobial properties to a surface of the building. The substrate can be a desk, a chair, a table, bathroom surfaces as described above, a floor, an interior wall, and other surfaces of a building. An antimicrobial polymer coating formulation can alternatively be applied over a substrate in a walkway or a people mover to provide antimicrobial properties to the walkway or the people mover. The substrate in this case can be stairs, an escalator, an elevator, a moving walkway, handrails of the walkway, control buttons of the elevator, and other walkway or people mover surfaces. An antimicrobial polymer coating formulation can alternatively be applied to a substrate for food packaging to provide antimicrobial properties to the food packaging. The coating of the food packaging can be transparent or partially transparent so that a consumer can see the contents of the food packaging. The coating of the food packaging can be breathable to preserve the quality of the packaged food. An antimicrobial polymer coating formulation can alternatively be applied to a substrate for clothing, such a substrate comprising natural, synthetic, composite fibers and fabrics, to provide antimicrobial properties to the clothing. Such clothing can be surgical gowns, hospital gowns, infant clothing, toddler clothing, or any clothing in which antimicrobial properties are desired. An antimicrobial polymer coating formulation can alternatively be applied to a substrate for a filter of any fluid. For example, the filter can filter air, blood, water, or other fluids to remove or to kill microbes.

The antimicrobial polymer coated surface can provide antimicrobial activity to any amount of aqueous solution. For example, the antimicrobial polymer coated surface can remove, inactivate, or kill microbes from blood in vivo and/or in vitro. For example, the antimicrobial polymer coated surface can be used to filter donated blood in vitro to remove diseases, such as coronavirus, HIV, hepatitis, syphilis, and other infections. For example, the antimicrobial polymer coated surface can be used to treat human patients by in vivo recirculating blood from a human patient through a blood filter comprising an antimicrobial polymer coated surface to treat viral or bacterial infections by removing or killing the viruses or bacterial. For example, the antimicrobial polymer coated surface can be used to treat human patients by in vivo recirculating blood from a human patient through a blood filter comprising an antimicrobial polymer coated surface to treat blood cancers, such as by the removal or killing of cancerous leukemia, lymphoma, or myeloma cells.

In certain aspects, the antimicrobial polymer composition can be applied as a solution or a cream to human skin as a sanitizer to remove or to kill microbes. In certain aspects, the antimicrobial polymer composition can be used as a medicine applied topically, intravenously, or orally to the human body as a medicine to target general microbes, such as a general antiviral, or to target a specific microbe, such as a specific virus.

As used herein, "free" or "substantially free" of a material can refer to a composition, component, or phase where the material is present in an amount of less than 10.0 weight %, less than 5.0 weight %, less than 3.0 weight %, less than 1.0 weight %, less than 0.1 weight %, less than 0.05 weight %, less than 0.01 weight %, less than 0.005 weight %, or less than 0.0001 weight % based on a total weight of the composition, component, or phase.

Additionally, all numerical values are "about" or "approximately" the indicated value, and take into account experimental error and variations that would be expected by a person having ordinary skill in the art. It should be appreciated that all numerical values and ranges disclosed herein are approximate values and ranges. The terms "about" or "substantial" and "substantially" or "approximately," with reference to amounts or measurement values, are meant that the recited characteristic, parameter, or values need not be achieved exactly. Rather, deviations or variations, including, for example, tolerances, measurement error, measurement accuracy limitations, and other factors known to those skilled in the art, may occur in amounts that do not preclude the effect that the characteristic was intended to provide. As used herein, "about" is to mean within +/−5% of a stated target value, maximum, or minimum value.

All references cited herein are hereby incorporated by reference in their entireties. In the event of a conflict in a definition in the present disclosure and that of a cited reference, the present disclosure controls.

In certain aspects, an antimicrobial polymer coated surface as described herein is or can become a hydrophilic surface. Additional exemplary examples of antimicrobial polymers or nanoworms, as well as specifics of synthesizing such polymeric nanoworms are disclosed in U.S. Provisional Patent Applications 62/899,983 and 63/049,813, which are hereby incorporated by reference in their entirety. For example, an antimicrobial polymer coated surface is or can become hydrophilic allowing the spread of a droplet, such as a mucosal drop, blood, urine, sweat, other bodily fluids, and other non-bodily fluids, across the antimicrobial polymer coated surface. In certain aspects, microbes on the surface of the droplet or suspended within the droplet can be captured and/or killed by the antimicrobial polymer coated surface.

In certain aspects, an antimicrobial polymer coated surface responds to environmental conditions of a droplet and surrounding external conditions. For example, an antimicrobial polymer coated surface can respond to one or more environmental triggers, such as temperature, pH, salinity concentration, and/or light, to aid in the capture and killing of microbes. For instance, as a droplet evaporates, an antimicrobial polymer coated surface can change state from hydrophilic to water-insoluble. The change in state from hydrophilic to water-insoluble can enhance the capture and killing of microbes within a droplet. For example, one or more antimicrobial polymers of an antimicrobial polymer coated surface can have multiple adhesion or contact points to a microbe in which the change from hydrophilic to water-insoluble can exert a mechanical strain onto a microbe to dissociate or disassemble the microbe.

In certain aspects, a chemical composition and functionality of a plurality of antimicrobial polymers can be selected to enhance the capturing and killing of microbes. For example, an antimicrobial polymer coated surface can be chemically modified with a carboxylic acid group, an alkyne, a pyridine, a dopamine, a thiolactone, a biotin, an azide, a peptide sequence (including one or more amino acids), a nucleic acid sequence (including one or more nucleic acids), a sugar sequence (including one or more monosugars, polysugars), a protease, a glycanase, a polymer, quaternized amine groups, derivatives thereof, or combinations thereof, to capture/kill a broad range of microbes or to capture/kill a certain microbe, such as in response to a certain outbreak of a virus.

In certain aspects, an antimicrobial polymer coated surface is antimicrobial without being toxic to humans, animals, and/or plants. For example, antimicrobial compounds of an antimicrobial polymer coated surface are covalently bonded to the antimicrobial polymers. Since the antimicrobial polymers are strongly adhered to the surface by virtue of the coating formulation components as disclosed herein, the antimicrobial compounds of an antimicrobial polymer coated surface are prevented from being ingested or absorbed by skin into the human body.

In certain aspects, an antimicrobial polymer coated surface can be washed and re-used. For example, an antimicrobial polymer coated surface can be washed with water (e.g., rinsed), cleaning agents (e.g., detergents, soaps, surfactants), sanitizers, and/or disinfectants. An antimicrobial polymer coated surface can be washed to renew the antimicrobial polymer coated surface by removing captured or killed microbes from antimicrobial compounds of the antimicrobial polymers. Renewed antimicrobial polymers can capture and kill additional microbes which land on the antimicrobial polymer coated surface. For example, the antimicrobial compounds can be selected to capture and kill without covalent attachment to the microbe. Therefore, washing the antimicrobial polymers releases captured or killed microbes from the antimicrobial compounds and allows the antimicrobial compounds to be renewed for capture and killing of additional microbes.

In certain aspects, an antimicrobial polymer comprises a copolymer of a macro chain transfer agent (macroCTA) polymer units and alkene units. A macroCTA polymer is a polymer formed by reversible addition-fragmentation chain-transfer (RAFT) utilizing a RAFT agent in the polymerization of one or more unsaturated ethylene monomers. In certain aspects, the RAFT agent is incorporated in the macroCTA polymer which can be further polymerized with the addition of reactants.

In certain aspects, a RAFT agent is represented by the general formula (I):

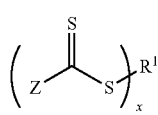

(I)

wherein $R^1$ is an x-valent group in which x is an integer $\geq 1$. The $R^1$ group can be mono-valent, di-valent, tri-valent or of higher valency. In certain aspects, x is an integer ranging from 1 to 20, such as from 1 to 10, or such as from 1 to 5. Accordingly, $R^1$ can be an optionally substituted polymer chain, with the remainder of the RAFT agent presented as multiple groups pendant from the polymer chain. The $R^1$ group can be an organic group or a substituted organic group that functions as a free radical leaving group under the polymerization conditions employed. The Z groups can independently be selected from the group consisting of organic groups and/or substituted organic groups that function to give a suitably high reactivity of the C=S moiety in the RAFT agent towards free radical addition.

Examples of $R^1$ of formula (I) include optionally substituted alkyl, alkenyl, alkynyl, aryl, acyl, carbocyclyl, heterocyclyl, heteroaryl, alkylthio, alkenylthio, alkynylthio, arylthio, acylthio, carbocyclylthio, heterocyclylthio, heteroarylthio, alkylalkenyl, alkylalkynyl, alkylaryl, alkylacyl, alkylcarbocyclyl, alkylheterocyclyl, alkylheteroaryl, alkyloxyalkyl, alkenyloxyalkyl, alkynyloxyalkyl, aryloxyalkyl, alkylacyloxy, alkylcarbocyclyloxy, alkylheterocyclyloxy, alkylheteroaryloxy, alkylthioalkyl, alkenylthioalkyl, alkynylthioalkyl, arylthioalkyl, alkylacylthio, alkylcarbocyclylthio, alkylheterocyclylthio, alkylheteroarylthio, alkylalkenylalkyl, alkylalkynylalkyl, alkylarylalkyl, alkylacylalkyl, arylalkylaryl, arylalkenylaryl, arylalkynylaryl, arylacylaryl, arylacyl, arylcarbocyclyl, arylheterocyclyl, arylheteroaryl, alkenyloxyaryl, alkynyloxyaryl, aryloxyaryl, alkylthioaryl, alkenylthioaryl, alkynylthioaryl, arylthioaryl, arylacylthio, arylcarbocyclylthio, arylheterocyclylthio, arylheteroarylthio, and a polymer chain.

Examples of $R^1$ of formula (I) include optionally substituted alkyl; saturated, unsaturated or aromatic carbocyclic or heterocyclic ring; alkylthio; dialkylamino; an organometallic species; and a polymer chain.

Specific examples of $R^1$ of formula (I) include optionally substituted C1-C18 alkyl, C2-C18 alkenyl, C2-C18 alkynyl, C6-C18 aryl, C1-C18 acyl, C3-C18 carbocyclyl, C2-C18 heterocyclyl, C3-C18 heteroaryl, C1-C18 alkylthio, C2-C18 alkenylthio, C2-C18 alkynylthio, C6-C18 arylthio, C1-C18 acylthio, C3-C18 carbocyclylthio, C2-C18 heterocyclylthio, C3-C18 heteroarylthio, C3-C18 alkylalkenyl, C3-C18 alkylalkynyl, C7-C24 alkylaryl, C2-C18 alkylacyl, C4-C18 alkylcarbocyclyl, C3-C18 alkylheterocyclyl, C4-C18 alkylheteroaryl, C2-C18 alkyloxyalkyl, C3-C18 alkenyloxyalkyl, C2-C18 alkynyloxyalkyl, C7-C24 aryloxyalkyl, C2-C18 alkylacyloxy, C2-C18 alkylthioalkyl, C3-C18 alkenylthioalkyl, C3-C18 alkynylthioalkyl, C7-C24 arylthioalkyl, C2-C18 alkylacylthio, C4-C18 alkylcarbocyclylthio, C3-C18 alkylheterocyclylthio, C4-C18 alkylheteroarylthio, C4-C18 alkylalkenylalkyl, C4-C18 alkylalkynylalkyl, C8-C24 alkylarylalkyl, C3-C18 alkylacylalkyl, C13-C24 arylalkylaryl, C14-C24 arylalkenylaryl, C14-C24 arylalkynylaryl, C13-C24 arylacylaryl, C7-C18 arylacyl, C9-C18 arylcarbocyclyl, C8-C18 arylheterocyclyl, C9-C18 arylheteroaryl, C8-C18 alkenyloxyaryl, C8-C18 alkynyloxyaryl, C12-C24 aryloxyaryl, C7-C18 alkylthioaryl, C8-C18 alkenylthioaryl, C8-C18 alkynylthioaryl, C12-C24 arylthioaryl, C7-C18 arylacylthio, C9-C18 arylcarbocyclylthio, C8-C18 arylheterocyclylthio, C9-C18 arylheteroarylthio, and a polymer chain having a number average molecular weight in the range of about 500 to about 80,000, for example in the range of about 500 to about 30,000

Examples of Z of formula (I) include F, Cl, Br, I, alkyl, aryl, acyl, amino, carbocyclyl, heterocyclyl, heteroaryl, alkyloxy, aryloxy, acyloxy, acylamino, carbocyclyloxy, heterocyclyloxy, heteroaryloxy, alkylthio, arylthio, acylthio, carbocyclylthio, heterocyclylthio, heteroarylthio, alkylaryl, alkylacyl, alkylcarbocyclyl, alkylheterocyclyl, alkylheteroaryl, alkyloxyalkyl, aryloxyalkyl, alkylacyloxy, alkylcarbocyclyloxy, alkylheterocyclyloxy, alkylheteroaryloxy, alkylthioalkyl, arylthioalkyl, alkylacylthio, alkylcarbocyclylthio, alkylheterocyclylthio, alkylheteroarylthio, alkylarylalkyl, alkylacylalkyl, arylalkylaryl, arylacylaryl, arylacyl, arylcarbocyclyl, arylheterocyclyl, arylheteroaryl, aryloxyaryl, arylacyloxy, arylcarbocyclyloxy, arylheterocyclyloxy, arylheteroaryloxy, alkylthioaryl, arylthioaryl, arylacylthio, arylcarbocyclylthio, arylheterocyclylthio, arylheteroarylthio, dialkyloxy-, diheterocyclyloxy- or diaryloxy-phosphinyl, dialkyl-, diheterocyclyl- or diaryl-phosphinyl, cyano (i.e. —CN), and —S—R, where R is as defined with respect to formula (I).

Specific examples of Z of formula (I) include F, Cl, and optionally substituted C1-C18 alkyl, C6-C18 aryl, C1-C18 acyl, amino, C3-C18 carbocyclyl, C2-C18 heterocyclyl, C3-C18 heteroaryl, C1-C18 alkyloxy, C6-C18 aryloxy, C1-C18 acyloxy, C3-C18 carbocyclyloxy, C2-C18 heterocyclyloxy, C3-C18 heteroaryloxy, C1-C18 alkylthio, C6-C18 arylthio, C1-C18 acylthio, C3-C18 carbocyclylthio, C2-C18 heterocyclylthio, C3-C18 heteroarylthio, C7-C24 alkylaryl, C2-C18 alkylacyl, C4-C18 alkylcarbocyclyl, C3-C18 alkylheterocyclyl, C4-C18 alkylheteroaryl, C2-C18 alkyloxyalkyl, C7-C24 aryloxyalkyl, C2-C18 alkylacyloxy, C4-C18 alkylcarbocyclyloxy, C3-C18 alkylheterocyclyloxy, C4-C18 alkylheteroaryloxy, C2-C18 alkylthioalkyl, C7-C24 arylthioalkyl, C2-C18 alkylacylthio, C4-C18 alkylcarbocyclylthio, C3-C18 alkylheterocyclylthio, C4-C18 alkylheteroarylthio, C8-C24 alkylarylalkyl, C3-C18 alkylacylalkyl, C13-C24 arylalkylaryl, C13-C24 arylacylaryl, C7-C18 arylacyl, C9-C18 arylcarbocyclyl, C8-C18 arylheterocyclyl, C9-C18 arylheteroaryl, C12-C24 aryloxyaryl, C7-C18 arylacyloxy, C9-C18 arylcarbocyclyloxy, C8-C18 arylheterocyclyloxy, C9-C18 arylheteroaryloxy, C7-C18 alkylthioaryl, C12-C24 arylthioaryl, C7-C18 arylacylthio, C9-C18 arylcarbocyclylthio, C8-C18 arylheterocyclylthio, C9-C18 arylheteroarylthio, dialkyloxy-, diheterocyclyloxy- or diaryloxy-phosphinyl (i.e. —P(=O)ORk2), dialkyl-, diheterocyclyl- or diaryl-phosphinyl (i.e. —P(=O)Rk2), where Rk is selected from optionally substituted C1-C18 alkyl, optionally substituted C6-C18 aryl, optionally substituted C2-C18 heterocyclyl, and optionally substituted C7-C24 alkylaryl, cyano (i.e. —CN), and —S—R, where R is as defined in respect of formula (I).

In the examples of $R^1$ and Z, it is understood that multi-component groups include subgroups of any order. For instance, the multi-component group of alkylaryls includes arylalkyls. The $R^1$ or Z can be branched and/or optionally substituted. Where the $R^1$ or Z comprises an optionally substituted alkyl moiety, an optional substituent includes where a —CH2— group in the alkyl chain is replaced by a group selected from —O—, —S—, —NRa—, —C(O)— (i.e. carbonyl), —C(O)O— (i.e. ester), and —C(O)NRa— (i.e. amide), where Ra can be selected from hydrogen, alkyl, alkenyl, alkynyl, aryl, carbocyclyl, heteroaryl, heterocyclyl, arylalkyl, and acyl.

Reference herein to an x-valent, multi-valent or di-valent "form of . . . " is intended to mean that the specified group is an x-valent, multi-valent or di-valent radical, respectively. For example, where x is 2, the specified group is intended to be a divalent radical. In that case, a divalent alkyl group is in effect an alkylene group (e.g. —CH2—). Similarly, the divalent form of the group alkylaryl can, for example, be represented by —(C6H4)—CH2—, a divalent alkylarylalkyl group can, for example, be represented by —CH2—(C6H4)—CH2—, a divalent alkyloxy group can, for example, be represented by —CH2-O—, and a divalent alkyloxyalkyl group can, for example, be represented by —CH2-O—CH2—. Where the term "optionally substituted" is used in combination with such an x-valent, multi-valent or di-valent group, that group can be substituted or fused as herein described. Where the x-valent, multi-valent, di-valent groups comprise two or more subgroups, for example [group A][group B][group C] (e.g. alkylarylalkyl), if viable one or more of such subgroups can be optionally substituted.

In certain aspects, part or all of the RAFT agent is incorporated into the macroCTA polymer. In certain aspects, $R^1$ and —S—(S=O)—Z are incorporated into the macroCTA polymer. Examples of RAFT polymerized macroCTAs include, but are not limited to, poly(N-isopropylacrylamide) (PNIPAM), poly(N,N-(dimethylamino)ethyl methacrylate) (F), poly(N-acetoxyethyl acrylamide) (PNAEAA), poly(acryloylglycine ethyl ester) (PNAGEE), poly((ethylene glycol)methyl ether methacrylate) (PEG-MEMA), poly((propylene glycol)methacrylate) (PPGMA), poly(N,N-dimethylacrylamide) (PDMA), poly(N-decylacrylamide) (PDcA), poly(N,N-diethylacrylamide) (PDEA), poly(N-acryloylglycine) (PNAG), poly(N-acryloylglycine methyl ester) (PNAGME), poly(N-acryloylglycine ethyl ester) (PNAGEE) and poly(N-acryloylglycine propyl ester) (PNAGPE), other polyacrylamides, other polyacrylates, and copolymers thereof.

For example, a macroCTA comprising poly(NIPAM) has the general formula (II):

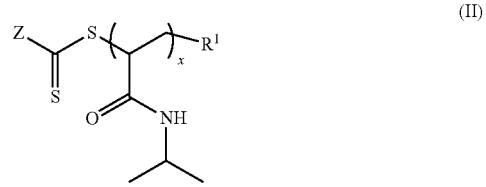

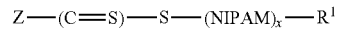

in which Z and $R^1$ (including pre or post-functionalized $R^1$ groups) are components of a RAFT agent. In certain aspects, x is an integer from 10 to 100. In certain aspects, x and y is any positive integer.

For example, a macroCTA comprising a poly(NIPAM-co-DMAEMA) has the general formula (III):

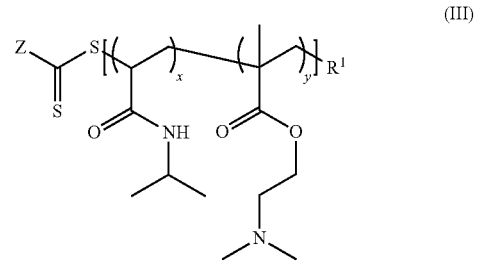

in which Z and $R^1$ (including pre or post-functionalized $R^1$ groups) are components of a RAFT agent. In certain aspects, x is an integer from 10 to 100, and y is an integer from 10 to 100. In certain aspects, x and y is any positive integer. The sequence of the monomers of the macroCTA copolymer, such as the NIPAM and DMAEMA monomers of a macroCTA copolymer of formula (III) can be any sequence, such as in a random, alternating, statistical, periodic, or block sequence.

In certain aspects, a macroCTA polymer is used to form a nanoworm or antimicrobial polymer by further polymerizing macroCTA polymer units and alkene monomers. For example, an antimicrobial polymer can be produced by first producing macroCTA polymer units with a RAFT agent in which the RAFT agent is incorporated into each macroCTA polymer unit. The macroCTA polymer units and alkene monomers are polymerized together to form an antimicrobial polymer. The RAFT agent incorporated into the macroCTA polymerizes the alkene units and the macroCTA units to form an antimicrobial polymer of the general formula (IV):

(Alkene Units)$m$(MacroCTA Units)$n$ (IV)

in which each of the macroCTA includes a pre or post-functionalized $R^1$ group as a component of a RAFT agent. The antimicrobial polymer includes the macroCTA units, the alkene units, and components of the RAFT agent units. The alkene units and the MacroCTA units can be formed into the antimicrobial polymer in any sequence, such as in a random, alternating, statistical, periodic, or block sequence.

The polyalkene is formed by polymerization of any suitable alkene monomers and combinations thereof. Examples of suitable alkene monomers include ethylene, propylene, 1-butene, 1-pentene, 4-methyl-1-pentene, 1-hexene, 1-heptene, 1-octene, 1-decene, norbornene, styrenes, acrylates, methacrylates, other vinyl compounds, substituted compounds thereof, and derivatives thereof. In certain aspects, polyalkene units of an antimicrobial polymer comprises m monomer units from 20 to 400 alkene monomer units, such as from 25 to 35 alkene monomer units. In certain aspects, the polyalkene comprises polystyrene. In certain aspects, MacroCTA units of an antimicrobial polymer comprises n MacroCTA units from 1 to 200, such as from 2 to 100. In certain aspects, m and n is any positive integer.

For example, an antimicrobial polymer comprising a polystyrene and a macroCTA of poly(NIPAM-co-DMEA) has the general formula (V):

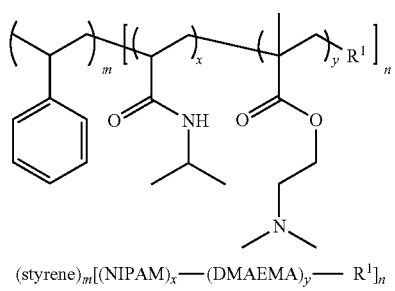

(styrene)$_m$[(NIPAM)$_x$—(DMAEMA)$_y$— R$^1$]$_n$ in which R$^1$ is a pre or post-functionalized R$^1$ group as a component of a RAFT agent. In certain aspects, x is an integer from 10 to 100, y is an integer from 10 to 100, m is an integer from 20 to 400, and n is an integer from 1 to 200. In certain aspects, x, y, m, and n is any positive integer.

The macroCTA polymer units can be selected to provide certain properties to an antimicrobial polymer. The macroCTA polymer units can be configured to respond to temperature, pH, salinity concentration, light, or combinations thereof. For example, a macroCTA polymer unit can change miscibility with a droplet based upon temperature alone or based upon temperature, pH, salinity concentration, and/or light of the droplet or other external environmental conditions.

In certain aspects, the macroCTA polymer units can contain temperature responsive monomers and/or functional groups in any suitable amount. A temperature responsive macroCTA polymer unit can have a LCST, an upper critical solution temperature (UCST), or both a LCST and a UCST. Examples of temperature responsive monomers or functional groups include those having amine functional groups, carbonyl functional groups, and combinations thereof. In certain aspects, the macroCTA polymer units have an LCST in water from about −20° C. to about +100° C.

In certain aspects, the macroCTA units can contain pH responsive monomers and/or functional groups in any suitable amount. Examples of pH responsive monomers include vinyl monomers such as acrylic acid, methacrylic acid, and other alkyl-substituted acrylic acids, maleic anhydride, maleic acid, 2-acrylamido-2-methyl-1-propanesulfonic acid, N-vinyl formamide, N-vinyl acetamide, aminoethyl methacrylate, phosphoryl ethyl acrylate, or methacrylate. Other examples of pH responsive monomers include polypeptides derived from amino acids (e.g. polylysine or polyglutamic acid), polysaccharides (e.g. alginic acid, hyaluronic acid, carrageenan, chitosan, carboxymethyl, cellulose), or nucleic acids such as DNA. Examples of pH sensitive functional groups include, but are not limited to —OPO(OH)2, —COOH, or —NH2.

In certain aspects, the macroCTA polymer units can contain saline responsive monomers and/or functional groups in any suitable amount. Examples of saline responsive monomers and/or functional groups include ureido amides, amines, carboxylic acid side groups, and other functional groups. Examples of a saline responsive macroCTA polymer unit include LCST polymers and/or UCST polymers.

In certain aspects, the macroCTA polymer units can contain light responsive monomers and/or functional groups in any suitable amount. Examples of light responsive monomers and/or functional groups include those with chromophoric functional groups. Chromophoric functional groups are any functional groups that are sensitive to electromagnetic radiation (i.e., visible or non-visible light). Examples of chromophoric functional groups include groups that can be or cause isomerization between a trans to a cis form; groups that can be or cause transition from a relatively non-polar hydrophobic, non-ionized state to a hydrophilic ionic state; and/or groups that are polymerized with other monomer or comonomer units in response to electromagnetic radiation.

The R$^1$ group of a RAFT agent, the R$^1$ group of a macroCTA polymer, or the R$^1$ group(s) of an antimicrobial polymer can be pre or post functionalized. For example, R$^1$ groups of an antimicrobial polymer can be post functionalized after formation of the antimicrobial polymer or can be pre functionalized prior to the formation of the antimicrobial polymer by functionalizing the R$^1$ group of the RAFT agent or functionalizing the R$^1$ group of the macroCTA polymer. For example, R$^1$ groups of a macroCTA polymer can be post functionalized after formation of the macroCTA polymer or can be pre functionalized prior to the formation of the macroCTA polymer by functionalizing the R$^1$ group of the RAFT agent.

The R$^1$ group of the RAFT agent, macroCTA polymer, and/or antimicrobial polymer can comprise or can be functionalized to comprise a carboxylic acid group, an alkyne, a pyridine, a dopamine, a thiolactone, a biotin, an azide, a peptide sequence, a nucleic acid sequence, a sugar sequence, a protease, a glycanase, a polymer, other functional groups, derivatives thereof, and combinations thereof. Specific examples of the R$^1$ group of the RAFT agent, macroCTA polymer, and/or antimicrobial polymer include, but are not limited to the following:

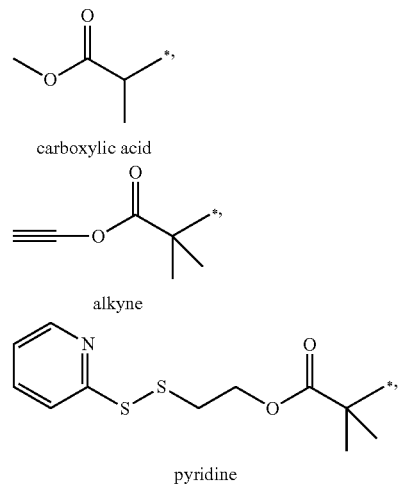

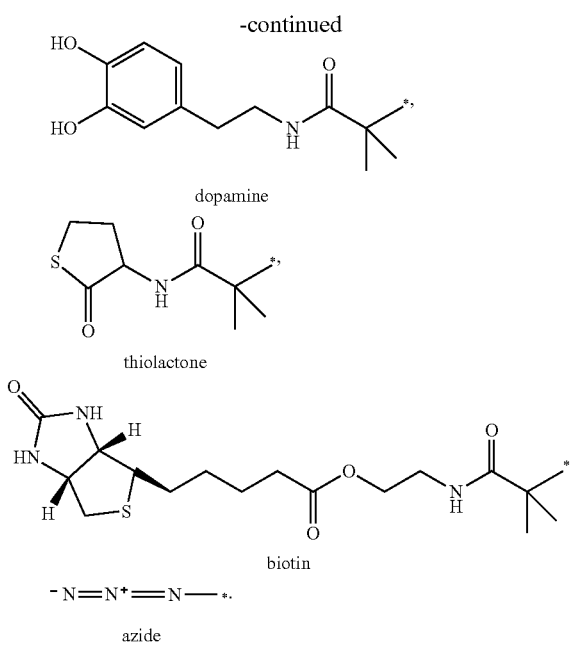

dopamine thiolactone biotin azide

The functional groups can be unsubstituted or substituted, unhalogenated or halogenated, and derivatives thereof.

In certain aspects, the $R^1$ group is functionalized to comprise a peptide sequence. In one example, a peptide sequence using a peptide azide can be coupled to a RAFT agent, a macroCTA polymer, or an antimicrobial polymer through a Cu(I)-catalyzed alkyne-azide (CuAAC) click reaction with a $R^1$ group comprising an alkyne functional group. In another example, a peptide sequence using a peptide alkyne can be coupled to a RAFT agent, a macroCTA polymer, or an antimicrobial polymer through a CuAAC click reaction with a $R^1$ group comprising an azide functional group.

In certain aspects, the $R^1$ group is functionalized to comprise a sugar sequence, such as through a CuAAC click reaction. Examples of sugars include fucose, glucose, mannose, galactose, GalNac, GlcNAc, sialic acid, other glycans, other amino sugars, other acid sugars, derivatives thereof, polysugars thereof, and combinations thereof. In certain aspects, it is believed that the functionalized sugar sequence $R^1$ group couples to a glycoprotein of an enveloped virus, interferes with glycosylation of an enveloped virus, interferes with attachment of an enveloped virus to a host cell, and/or interferes with entry of an enveloped virus to a host cell.

In certain aspects, the $R^1$ group is functionalized to comprise a protease (referring to any compound that breaks down a peptide or an amino acid), such as through a CuAAC click reaction. Examples of a protease include guanidine, guanidine derivatives, other general peptide denaturants, and specific peptide denaturants targeting asparagine, serine, threonine, or linkages thereof. In certain aspects, it is believed that the functionalized protease $R^1$ group couples to a glycoprotein of an enveloped virus, interferes with glycosylation of an enveloped virus, couples to a capsid of a non-enveloped virus, interferes with attachment of a virus (enveloped or non-enveloped) to a host cell, and/or interferes with entry of a virus (enveloped or non-enveloped) to a host cell.

In certain aspects, the $R^1$ group is functionalized to comprise a glycanase (referring to any compounds that breaks down glycans), such as through a CuAAC click reaction. Examples of a glycanase include general glycan denaturants and specific glycan denaturants targeting fucose, glucose, mannose, galactose, GalNac, GlcNAc, sialic acid, or linkages thereof. In certain aspects, it is believed that the functionalized glycanase $R^1$ group couples to a glycoprotein of an enveloped virus, interferes with glycosylation of an enveloped virus, interferes with attachment of an enveloped virus to a host cell, and/or interferes with entry of an enveloped virus to a host cell.

Exemplary examples of antibacterial polymers in accordance with the present disclosure may include polymers having a backbone which may comprise alkene units and the macroCTA polymer units. The antibacterial polymer may include $R^1$ groups from the macroCTA polymer units. The $R^1$ group is a component from a RAFT agent, which can be pre functionalized or post functionalized. The $R^1$ group can comprise any suitable $R^1$ group. The $R^1$ group can be selected to modify the capture and killing efficiency of the antibacterial polymer and/or to modify the responsiveness (e.g., temperature, pH, salinity concentration, light, or combinations thereof) of the antibacterial polymer.

In certain aspects, two or more sets of macroCTA polymer units are used to form an antibacterial polymer by further polymerizing the two or more sets of macroCTA polymers and alkene monomers. For example, an antibacterial polymer can be produced by first producing macroCTA-A units with an $R^1$ group and producing macroCTA-B units with an $R^1$ group. The $R^1$ groups of the macroCTA-A units and the $R^1$ groups of the macroCTA-B units can be the same or different. The macroCTA-A units, the macroCTA-B units, and alkene monomers are polymerized together to form an antibacterial polymer. The RAFT agent incorporated into the macroCTAs polymerizes the alkene units and the macroCTA polymer units to form an antibacterial polymer of the general formula (VI):

(Alkene Units)$m$(MacroCTA-A Units)$n$(MacroCTA-B Units)$o$     (VI)

in which each of the MacroCTA-A includes a pre or post-functionalized $R^1$ group as a component of a RAFT agent and in which each of the MacroCTA-B includes a pre or post-functionalized $R^1$ group as a component of a RAFT agent. The antibacterial polymer includes the macroCTA-A units, the macroCTA-B units, the alkene units, and components of the RAFT agent units. In certain aspects, m is an integer from 20 to 400, n is an integer from 1 to 200, and o is an n is an integer from 1 to 200. In certain aspects, m, n, and o is any positive integer. The alkene units, the MacroCTA-A units, and the MacroCTA-B units can be formed into the antibacterial polymer in any sequence, such as in a random, alternating, statistical, periodic, or block sequence.

Certain exemplary antibacterial polymers may have two different $R^1$ groups. A backbone of the antibacterial polymer may comprise the alkene units and the macroCTA-A units, and the macroCTA-B units. The antibacterial polymer may include a $R^1$ group from the macroCTA-A units and includes a $R^1$ group from the macroCTA-B units. The $R^1$ groups are each a component from a RAFT agent, which can be pre functionalized or post functionalized. The $R^1$ groups can comprise any suitable $R^1$ groups, such as an alkyne for $R^1$ group and such a B-thiolactone group for $R^1$ group. The same or different $R^1$ groups of the macroCTA-A and of the macroCTA-B can be selected to modify the capture and killing efficiency of the antibacterial polymer and/or to modify the responsiveness (e.g., temperature, pH, salinity concentration, light, or combinations thereof) of the antibacterial polymer.

Exemplary examples of an antibacterial polymer may be synthesized with an $R^1$ group further functionalized to include a macromolecule according to certain aspects. The antibacterial polymer may include a $R^1$ group comprising an alkyne group. A macromolecule azide can react with an alkyne group of through a Cu(I)-catalyzed alkyne-azide (CuAAC) click reaction to form a functionalized $R^1$ group comprising a macromolecule at the end of a macroCTA polymer unit. For example, the macromolecule azide can comprise a peptide azide, a nucleic acid azide, a sugar azide, a protease azide, a glycanase azide, a polymer azide, or other macromolecule azide to respectively form a macromolecule comprising a peptide sequence, a nucleic acid sequence, a sugar sequence, a protease, a glycanase, a polymer, or other macromolecule. In other aspects, any macromolecule can comprise or be coupled to the $R^1$ groups of the macroCTA polymer units by any reaction scheme, such as through a reaction of a macroCTA polymer units quaternized with azide groups reacting with macromolecule alkynes.

Alternate antibacterial polymers with quaternized amine groups, may be synthesized according to certain aspects. One or more of the macroCTA polymer units may have one or more tertiary amine groups. The tertiary amine group can be quaternized with any suitable R2 group. The R2 group of the quaternized amine group can comprise or can be functionalized to comprise a carboxylic acid group, an alkyne, a pyridine, a dopamine, a thiolactone, a biotin, an azide, a peptide sequence, a nucleic acid sequence, a sugar sequence, a protease, a glycanase, a polymer, other functional groups, derivatives thereof, and combinations thereof. The tertiary amine group can be quaternized by reaction with an R2 halide or by other R2 compounds. Specific examples of an R2 group includes an alkyl moiety, an alkyne moiety, and combinations thereof.

In certain aspects, R2 is an alkyl group of any suitable carbon length. An alkyl halide can quaternize a tertiary amine to form an alkyl moiety. An antibacterial polymer with a macroCTA polymer unit having a plurality of tertiary amine groups can be quaternized with a certain ratio of different alkyl groups R2. The ratio of quaternized short chain alkyl groups from 1 to 4 carbons to long chain alkyl groups of 5 or more carbons can be selected to adjust the properties of the antibacterial polymer. For example, individual alkylamino groups of the monomers of the macroCTA polymer unit of an antibacterial polymer can be functionalized with a quaternized methyl group or with a quaternized octyl groups. For example, an antibacterial polymer comprising a macroCTA polymer unit of poly (NIPAM-co-DMAEMA) can be quaternized to have z % long chain alkyl groups and (1-z %) short chain alkyl groups having the general structure (VII):

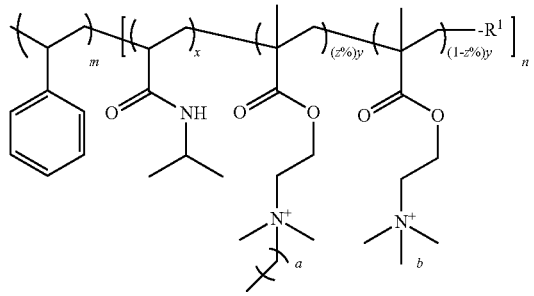

(VII)

in which $R^1$ (including pre or post-functionalized $R^1$ groups) are components of a RAFT agent. In certain aspects, x is an integer from 10 to 100, y is an integer from 10 to 100, z is an integer from 1 to 99, m is an integer from 20 to 400, n is an integer from 1 to 200, a is an integer of 4 or more, and b is an integer from 1 to 4, in which the monomers of the macroCTA polymer unit are in any sequence and the styrene and the macroCTA polymers units are in any sequence. In certain aspects, a, b, x, y, z, m, and n is any positive integer.

The macroCTA polymer units can be quaternized with alkyl groups to modifying the capture and killing efficiency of the macroCTA polymer units and/or to modify the responsiveness (e.g., temperature, pH, salinity concentration, light, or combinations thereof) of the macroCTA polymer units. In certain aspects, an increased ratio of short alkyl quaternized groups from 1 to 4 carbons to long alkyl quaternized groups of 5 or more carbons increases a lower critical solution temperature (LCST) in water of the macroCTA polymer unit. While not intending to be bound by any theory, it is believed that an alkyl group R2 of 5 or more carbons, such as pentyl groups or above, can provide cell membrane penetration of the alkyl moiety into the hydrophobic portion of a cell membrane (such as a viral cell envelope, a non-enveloped viral cell capsid, a bacterial cell membrane, or fungus cell membrane). While not intending to be bound by any theory, it is believed that a quaternary ammonium cation can provide interactions with a cell membrane surface (such as the interactions of phosphate moieties of a phospholipid bilayer of a cell membrane surface). While not intending to be bound by any theory, it is believed that the quaternary ammonium cation provides hydrophilicity to a macroCTA polymer unit so that the alkyl moieties of the alkylamino group do not become buried within the polyalkene.

In certain aspects, the R2 group is functionalized to comprise a peptide sequence. In one example, a peptide sequence using a peptide azide can be coupled to a quaternized amine group through a Cu(I)-catalyzed alkyne-azide (CuAAC) click reaction with a quaternized amine group comprising an alkyne functional group. In another example, a peptide sequence using a peptide alkyne can be coupled to a quaternized amine group through a CuAAC click reaction with a quaternized amine group comprising an azide functional group.

In certain aspects, the R2 group is functionalized to comprise a sugar sequence, such as through a CuAAC click reaction. Examples of sugars include fucose, glucose, mannose, galactose, GalNac, GlcNAc, sialic acid, other glycans, other amino sugars, other acid sugars, derivatives thereof, polysugars thereof, and combinations thereof. In certain aspects, it is believed that the functionalized sugar sequence R2 group couples to a glycoprotein of an enveloped virus, interferes with glycosylation of an enveloped virus, interferes with attachment of an enveloped virus to a host cell, and/or interferes with entry of an enveloped virus to a host cell.

In certain aspects, the R2 group is functionalized to comprise a protease (referring to any compound that breaks down a peptide or an amino acid), such as through a CuAAC click reaction. Examples of a protease include guanidine, guanidine derivatives, other general peptide denaturants, and specific peptide denaturants targeting asparagine, serine, threonine, or linkages thereof. In certain aspects, it is believed that the functionalized protease R2 group couples to a glycoprotein of an enveloped virus, interferes with glycosylation of an enveloped virus, couples to a capsid of a non-enveloped virus, interferes with attachment of a virus (enveloped or non-enveloped) to a host cell, and/or interferes with entry of a virus (enveloped or non-enveloped) to a host cell.

In certain aspects, the R2 group is functionalized to comprise a glycanase (referring to any compounds that breaks down glycans), such as through a CuAAC click reaction. Examples of a glycanase include general glycan denaturants and specific glycan denaturants targeting fucose, glucose, mannose, galactose, GalNac, GlcNAc, sialic acid, or linkages thereof. In certain aspects, it is believed that the functionalized glycanase R2 group couples to a glycoprotein of an enveloped virus, interferes with glycosylation of an enveloped virus, interferes with attachment of an enveloped virus to a host cell, and/or interferes with entry of an enveloped virus to a host cell.

An antibacterial polymer may be formed with macroCTA polymers with quaternized amine groups including an alkyne moiety according to certain aspects. For example, a macromolecule azide can react with an alkyne moiety through a CuAAC click reaction to form a macromolecule coupled to the macroCTA polymer of the core according to certain aspects. For example, the macromolecule azide can comprise a peptide azide, a nucleic acid azide, a sugar azide, a protease azide, a glycanase azide, a polymer azide, or other macromolecule azide to respectively form a macromolecule comprising a peptide sequence, a nucleic acid sequence, a sugar sequence, a protease, a glycanase, a polymer, or other macromolecule. In other aspects, any macromolecule can be coupled to the quaternized amine groups of the macroCTA polymer units by any reaction scheme, such as through a reaction of a macroCTA polymer units quaternized with azide groups reacting with macromolecule alkynes.

The macromolecules and/or the macromolecules can independently comprise a grafted polymer with one or more properties including, but not limited to, temperature responsive (LCST, UCST, or both) polymers, pH responsive polymers, light responsive polymers, saline concentration responsive polymers, or combinations thereof. The grafted polymer can comprise a polymer from by any suitable polymerization method, such as addition polymerization (including anionic and cationic polymerization), chain polymerization, free radical or living radical polymerization (including atom transfer radical polymerization or ATRP), metal catalyzed polymerization, nitroxide polymerization, degenerative chain transfer polymerization, RAFT, SET-LRP, and condensation polymerization.

The grafted polymers of macromolecules and/or the macromolecules can be further functionalized. The grafted polymers can be further functionalized with a peptide sequence, a nucleic acid sequence, a sugar sequence, a protease, a glycanase, and combinations thereof. For example, the grafted polymer can include tertiary amine groups which are quaternized. The quaternized amine groups of the grafted polymer can be further functionalized to include a peptide sequence, a nucleic acid sequence, a sugar sequence, a protease, a glycanase, and combinations thereof. The quaternized amine groups of the grafted polymer can be further functionalized with two or more of a peptide sequence, a nucleic acid sequence, a sugar sequence, a protease, a glycanase, and combinations thereof in order to capture and killing efficiency of the antimicrobial polymer and/or to target general or specific microbes.

In certain aspects, an antimicrobial polymer comprising one or more sets of MacoCTA polymer units and one or more grafted polymers has the general formula (VIII)

$$(\text{Alkene Units})m(\text{MacroCTA Units})n(\text{Grafted Polymer})o \qquad \text{(VIII)}$$

in which each of the MacroCTA includes a pre or post-functionalized $R^1$. In one aspect, the grafted polymer can be grafted to the $R^1$ group of the MacroCTA. In another aspect, the grafted polymer is grafted to quaternary amine groups of the macroCTA polymer units. In still another aspect, the grafted polymer is grafted both to the $R^1$ group of the MacroCTA and to quaternary amine groups of the macroCTA polymer units. In certain aspects, m is an integer from 20 to 400, n is an integer from 1 to 200, and o is an integer from 1 to 10,000. In certain aspects, m, n, and o is any positive integer.

The antimicrobial polymers described herein, such as the antimicrobial polymers of general formula (IV)-(VII), the Z group of the macroCTA polymer units as a component of a RAFT agent may remain or may be cleaved off. In certain aspects, an antimicrobial polymer including a Z group of the macroCTA polymer as a component of a RAFT agent may be further polymerized and/or cross-linked with another one or more antimicrobial polymer.

An antimicrobial polymer of the present disclosure can have anti-microbial properties, such as capturing, killing, inactivating, disassembly, degenerating, disinfecting, sanitizing, and/or removal of microbes, by selection of macroCTA polymer units, quaternization of tertiary amine groups of the macroCTA polymer units, of a $R^1$ group of the macroCTA polymer units, of a R2 group of quaternization of tertiary amine groups of the macroCTA polymers, of functionalization of the $R^1$ group to include a macromolecule, of functionalization of the R2 group to include a macromolecule, macromolecules comprising grafted polymers, functionalization of the grafted polymers, or of combinations thereof. Such, selection can impact the responsiveness of the antimicrobial polymer to temperature, pH, salinity concentration, and/or light.

Viral killing or inhibitor peptides or peptide mimics coupled to an antimicrobial polymer as a $R^1$ group of a macroCTA, as a R2 group of a macroCTA, and/or to another grafted polymer include, but are not limited to the peptides of TABLES 1-3. TABLE 1 includes peptides inhibiting virus attachment and virus-cell membrane fusion. TABLE 2 includes peptides disrupting viral envelopes. TABLE 3 includes peptides inhibiting viral replication. The peptides can target certain viruses or a broad spectrum of viruses. Other suitable peptide or peptide mimics can also be coupled to a nanoworm to provide antimicrobial properties.

TABLE 1

The Peptides Inhibiting Virus Attachment and Virus-Cell Membrane Fusion

| Peptide | Influenza Serotype | Sequence | SEQ. ID No. |
|---|---|---|---|
| EB peptide | Broad spectrum | RRKKAAVALLPAVLLALLAP | 1 |
| Derived EB peptide | Broad spectrum | RRKKLAVLLALLA | 2 |
| P1 | H9N2 | NDFRSKT | 3 |

TABLE 1-continued The Peptides Inhibiting Virus Attachment and Virus-Cell Membrane Fusion

| Peptide | Influenza Serotype | Sequence | SEQ. ID No. |
|---|---|---|---|
| P1 cyclic | H9N3 | CNDFRSKTC | 4 |
| FluPep 1 | H1N1 | WLVFFVIFYFFR | 5 |
| FluPep 2 | H1N1 | WLVFFVIAYFAR | 6 |
| FluPep 3 | H1N1 | WLVFFVIFYFFRRRKK | 7 |
| FluPep 4 | H1N1 | RRKKWLVFFVIFYFFR | 8 |
| FluPep 7 | H1N1 | RRKKIFYFFR | 9 |
| FluPep 8 | H1N1 | WLVFFVRRKK | 10 |
| FluPep 9 | H1N1 | FFVIFYRRKK | 11 |
| C18-s2 | H1N1, H3N2 | C17H35CO-ARLPRTMVHPKPAQP-NH2 | 12 |
| Pal L1 | H5N1 | C16-ARLPRTMVHPKPAQP | 13 |
| Pal M1 | H5N1 | C16-ARLPRTMV | 14 |
| Pal S1 | H5N1 | C16-ARLPR | 15 |
| Flufirvitide | Broad spectrum | — | |
| PEP 19-2.5 | H7N7, H3N2, H1N1 | GCKKYRRFRWKFKGKFWFWG | 16 |
| PEP 19-4 | H7N7, H3N2, H1N1 | GKKYRRFRWKFKGKWFWG | 17 |
| PEP 19-8D | H7N7, H3N2, H1N1 | GFWFKGKWRFKKYRGGRYKKFRWK-GKFWFG | 18 |
| PEP 19-CP | H7N7, H3N2, H1N1 | SSNKSTTGSGETTTA | 19 |
| Defensins | H1N1, H3N2 | ACYCRIPACIAGERRYGTCIYQGRLWAFCC | 20 |

TABLE 2

The Peptides Disrupting Viral Envelope

| Peptide | Influenza Serotype | Sequence | SEQ. ID. No. |
|---|---|---|---|
| LF C-lobe peptide 1 | H1H1, H3N2 | SKHSSLDCVLRP | 21 |
| LF C-lobe peptide 2 | H1H1, H3N2 | AGDDQGLDKCVPNSKEK | 22 |
| LF C-lobe peptide 3 | H1H1, H3N2 | NGESSADWAKN | 23 |
| Mucroporin-M1 | H5N1, H1N1 | LFRLIKSLIKRLVSAFK | 24 |
| LL-37 | H1N1, H3N2 | LLGDFFRKSKEKIGKEFKRIVQ-RIKDFLRNLVPRTES | 25 |

TABLE 3

The Peptides Inhibiting Viral Replication

| Peptide | Influenza Serotype | Sequence | SEQ. ID No. |
|---|---|---|---|
| PB1125 | Broad spectrum | MDVNPTLLFLKVPAQNAISTTFPYT | 26 |
| PB2137 | H1N1, H5N1 | MERIKELRDLMSWSRTREILTKTTV-DHMAIIKKYTSG | 27 |
| PB1731757 | H5N1 | ESGRIKKEEFAEIMKICSTIEELGRQK | 28 |

TABLE 3-continued

| The Peptides Inhibiting Viral Replication | | | |
|---|---|---|---|
| Peptide | Influenza Serotype | Sequence | SEQ. ID No. |
| PB1125AT6Y | H1N1, H5N1 | MDVNPYLLFLKVPAQ | 29 |
| Killer peptide | H7N1 | AKVTMTCSAS | 30 |
| HNP-1 | H3N2 | CYCRIPACIAGERRYGTCIYQGRLWAFCC | 31 |
| Peptid 6 | H1N1, H3N2 | CATCEQIADSQHRSHRQMV | 32 |

Exemplary antimicrobial coating compositions in accordance with the present disclosure may be formulated with the antimicrobial polymer composition as described, with an approximate range of from about 0.1 weight % to about 30 weight % of the total weight of the antimicrobial coating composition, one or more reactive silanes, which in exemplary examples may include a glycidoxypropyl functional silane, such as (3-Glycidyloxypropyl)trimethoxysilane, also referred to as GPTMS in an approximate range of from about 0.1 weight % to about 10 weight % of the total weight of the antimicrobial coating composition, one or more wetting agents, such as a surfactant or a co-solvent, in an approximate range of from about 0.01 weight % to about 0.50 weight % of the total weight of the antimicrobial coating composition for a surfactant, or in an approximate range of from about 0.5 weight % to about 30 weight % of the total weight of the antimicrobial coating composition for a co-solvent. The reminder of the formulation, up to about 95 weight % or about 99 weight % of the total weight of the antimicrobial coating composition is made of a solvent. An exemplary solvent for the antimicrobial coating composition includes water. Optional components of the antimicrobial coating composition in certain exemplary examples may include catalysts, including acidic catalysts such as acetic acid, or basic catalysts such as ammonium hydroxide, functional additives, such as fluorescent markers, colorants, and the like.

A particular exemplary antimicrobial polymer or nanoworm, in addition to those described previously, may further include a macro-CTA polymer as described designated as P13-CA, which may be obtained from the University of Queensland, under Boeing SDS number 305063. This particular antimicrobial polymer has a fluorescent marker attached to it, which allows it to be detected with a UV light source. Alternative examples may not include a fluorescent marker attached to it and may include a separate additive imparting the qualities of a fluorescent marker separately as part of a coating formulation.

The antimicrobial polymer or nanoworm, also referred to as P13-CA can be prepared by following a synthetic route including three steps. The initial, first step is the preparation of base nanoworms, or antibacterial polymer backbone. As noted previously, the preparation of the base nanoworms, in this case alkyne-γ-thiolactone PDMAEMA nanoworms is done by RAFT-mediated emulsion polymerization. The second step is the quaternization of the prepared base nanoworms with iodooctane and of propargyl bromide. The final step includes a copper mediated alkyne-azide cycloaddition (CuAAC) of guanidine azide, polysugar azide and coumarin azide to quaternized base nanoworms.

The one or more antimicrobial polymer can be present in an amount of from about 0.01 weight % to about 25 weight %, based on a total weight of the antimicrobial coating composition. For example, the one or more antimicrobial polymer can be present in an amount of from about 0.01 weight %, about 0.5 weight %, about 1 weight %, about 1.5 weight %, about 2 weight %, or about 2.5 weight % to about 2.75 weight %, about 3 weight %, about 3.5 weight %, about 4 weight %, about 4.5 weight %, or about 10.0 weight %, based on a total weight of the antimicrobial coating composition. In another example, the one or more antimicrobial polymer can be present in an amount of from about 0.01 weight % to about 10.0 weight %, about 10.0 weight % to about 25 weight %, about 1 weight % to about 8.0 weight %, about 2.0 weight % to about 6.0 weight %, or about 5 weight %, based on a total weight of the antimicrobial coating composition.

The antimicrobial coating composition may include one or more reactive silanes, also referred to as adhesion promoters. The one or more reactive silanes, also referred to as silane adhesion promoters or silane coupling agents, of the antimicrobial coating composition can be capable of or configured to facilitate adhesion of a polymer-based antimicrobial coating formulation applied to a surface, or improve the durability thereof. For example, the adhesion promoter can be capable of or configured to promote compatibility and/or adhesion between a surface and the coating formulation. The one or more reactive silanes can be or include, but are not limited to, one or more compounds including at least one reactive silane, which may be referred to as organosilanes. Organosilanes are generally understood to be, but not necessarily limited to, multifunctional silicon-containing molecules that include a reactive functional group and one or more hydrolysable alkoxy group. Illustrative glycidoxy functional or epoxy functional silanes may include, but are not limited to, glycidoxypropyltrialkoxysilane (such as glycidoxypropyltrimethoxysilane, 3-glycidoxypropyltrimethoxysilane, 3-glycidoxypropyltriethoxysilane, and the like), 3-(2,3-epoxypropoxypropyl) methyldiethoxysilane, 2-(3,4-epoxycyclohexyl) ethyltrimethoxysilane, 3-(2,3-epoxypropoxypropyl) methyldimethoxysilane, 2-(3,4-Epoxycyclohexyl) ethylmethyldimethoxysilane, and combinations thereof. Illustrative reactive silanes can include, but are not limited to, bis(trimethoxysilylethyl)benzene, bis(triethoxysilylethyl)benzene, 3-Acryloxypropyltrimethoxysilane, 3-Methacryloxypropyltrimethoxysilane, aminopropyltrimethoxysilane, vinyl trimethoxysilane, allyl trimethoxysilane, mercaptopropyltrialkoxysilanes (such as mercaptopropyltrimethoxysilanes 3-Mercaptopropyltrimethoxysilane), or combinations thereof. Illustrative mercapto functional silanes may include, but are not limited to, 3-mercaptopropyltriethoxysilane, 3-mercaptopropyltrimethoxysilane, 11-mercaptoundecyltrimethoxysilane, s-(octanoyl) mercaptopropyltriethoxysilane, (mercaptomethyl)methyldiethoxysilane, 3-mercaptopropylmethyldimethoxysilane, and combinations thereof.

The one or more reactive silanes can be present in an amount of from about 0.01 weight % to about 25 weight %, based on a total weight of the antimicrobial coating composition. For example, the one or more adhesion promoters can be present in an amount of from about 0.01 weight %, about 0.5 weight %, about 1 weight %, about 1.5 weight %, about 2 weight %, or about 2.5 weight % to about 2.75 weight %, about 3 weight %, about 3.5 weight %, about 4 weight %, about 4.5 weight %, or about 10.0 weight %, based on a total weight of the antimicrobial coating composition. In another example, the one or more reactive silanes can be present in an amount of from about 0.01 weight % to about 10.0 weight %, about 10.0 weight % to about 25 weight %, about 1 weight % to about 8.0 weight %, about 2.0 weight % to about 6.0 weight %, or about 5 weight %, based on a total weight of the antimicrobial coating composition.

Illustrative alternatives to organosilanes or reactive silanes for incorporation into a antimicrobial coating composition may include organometallics including reactive titanates, reactive zirconates, reactive aluminates, or the like, or any combination thereof with one or more of the reactive silanes.

The antimicrobial coating composition can include one or more wetting agents. Wetting agents, for the purposes of this disclosure are intended to include surfactants and co-solvents and may be incorporated into the antimicrobial coating formulation. Wetting agents may be added to the antimicrobial coating formulation to improve coverage of coating on surfaces by reducing the surface tension. Wetting agents may also include co-solvents.

The antimicrobial coating composition can include one or more surfactants. As used herein, the term "surfactant" can refer to any component, compound, or substance that reduces surface tension in a solution or reduces interfacial tension between two liquids, or between a liquid and a solid or between a liquid and a gas. The one or more surfactants can be capable of or configured to facilitate or aid in the cleaning the surface of oil and/or debris. The one or more surfactants can be capable of or configured to facilitate migration or diffusion of one or more components of the antimicrobial coating composition onto or into a surface upon which the antimicrobial coating composition may be applied. The one or more surfactants can be capable of or configured to better disperse any one or more components, particulates, or elements of the antimicrobial coating composition with another one or more components, particulates, or elements of the antimicrobial coating composition. In an exemplary implementation, the antimicrobial coating composition includes at least one nonionic surfactant.

The one or more surfactants may include amphoteric molecules, or such common chemicals as sodium dodecylsulfate (CAS 151-21-3) and many other small molecular sulfates, carboxylates, quaternary ammoniums, and the like. Exemplary surfactants may also include proprietary and non-proprietary polymeric chemicals such as Pluronic (a polyethylene glycol/polypropylene glycol copolymer), BYK-349 (a PEG/PPG-modified silicone polymer), acrylic-modified fluoropolymers, and derivatives or combinations thereof. The one or more surfactants can be or include one or more anionic surfactants, one or more amphoteric surfactants, one or more cationic surfactants, one or more zwitterionic surfactants, one or more nonionic surfactants, or mixtures thereof. Illustrative surfactants of the antimicrobial coating composition can be or include, but are not limited to, ionic surfactants and/or nonionic surfactants including octylphenoxy polyethoxy ethanols, such as TRITON™ X-100, X-114, and X-405, commercially available from Union Carbide Co. of Danbury, CT.

The one or more surfactants can be present in an amount of from about 0.1 weight % to about 10 weight %, based on a total weight of the antimicrobial coating composition. For example, the one or more surfactants can be present in an amount of from about 0.1 weight %, about 0.5 weight %, about 1 weight %, about 1.5 weight %, about 2 weight %, about 3 weight %, about 4 weight %, or about 5 weight % to about 6 weight %, about 6.5 weight %, about 7 weight %, about 8 weight %, about 9 weight %, or about 10 weight %, based on a total weight of the antimicrobial coating composition. In another example, the one or more surfactants can be present in an amount of from about 0.1 weight % to about 10 weight %, about 2 weight % to about 8 weight %, or about 4 weight % to about 6 weight %.

Co-solvents may be added to a primary solvent or total formulation in small amounts to increase the solubility or dispersibility of a component in an overall formulation. Co-solvents may modify the polarity of the antimicrobial coating formulation. This change in the overall solvent polarity influences the wetting behavior of the coating system and, in certain embodiments, may modify the drying rate of the coating. Furthermore, more volatile molecules increase the drying rate, which may be beneficial from a cycle time or coating efficiency perspective. Conversely, slower drying or less volatile co-solvents allow the film to remain wet longer, increasing the amount of time the film has to level out while drying, thereby improving its appearance. Co-solvents added to an antimicrobial coating formulation may cause the polymer molecules to become more swelled by increasing the radius of gyration of the polymer, thus allowing the polymer molecules to become more interdigitated as they dry. This self-assembly effect may provide a more consistent, monolithic coating film as compared to antimicrobial coating formulations without the addition of co-solvents.

The one or more co-solvents of the antimicrobial coating composition may be capable of or configured to disperse, solubilize, solvate, or otherwise dissolve one or more substances or components of the antimicrobial coating composition. The one or more co-solvents of the antimicrobial coating composition can also be capable of or configured to disperse, solubilize, solvate, or otherwise dissolve one or more substances, such as greases, oils, or debris, on surfaces contacted with the antimicrobial coating composition. For example, the one or more co-solvents of the antimicrobial coating composition can be capable of or configured to dissolve the one or more reactive silanes, the one or more wetting agents, the one or more catalysts, the one the one or more functional additives, or combinations thereof. It should be appreciated that any solvent capable of or configured to dissolve one or more components of the antimicrobial coating composition can be utilized. The one or more co-solvents can be or include, but are not limited to, alcohols such as methanol, ethanol, propanol, and the like, polyols such as ethylene glycol, glycerine, and the like, or glycol ethers, such as 2-butoxyethanol, 2-(2-Butoxyethoxy)ethanol, and the like. Furthermore, aliphatic hydrocarbons, aromatic compounds, such as aromatic hydrocarbons, halogenated hydrocarbons, nitrated hydrocarbons, ketones, amines, esters, alcohols, aldehydes, ethers, or the like, or combinations thereof may also be utilized.

Illustrative alcohols that can be utilized as the one or more co-solvents can be or include, but are not limited to, methanol, ethanol, n-propanol, i-propanol, n-butanol, i-butanol, s-butanol, n-amyl alcohol, i-amyl alcohol, cyclohexanol, n-octanol, ethanediol, diethylene glycol, 1,2-propanediol, or the like, or combinations thereof.

Illustrative polyols that can be utilized as the one or more co-solvents can be or include, but are not limited to, glycerol, trimethylolpropane, pentaerythritol, polyethylene oxide, polyethylene glycol (PEG), polypropylene glycol (PPG), or the like, or combinations thereof.

Illustrative glycol ethers that can be utilized as the one or more co-solvents can be or include, but are not limited to, 2-methoxyethanol, 2-ethoxyethanol, 2-propoxyethanol, 2-isopropoxyethanol, 2-butoxyethanol, 2-phenoxyethanol, 2-benzyloxyethanol, 1-methoxy-2-propanol, 2-(2-methoxyethoxy)ethanol, 2-(2-ethoxyethoxy)ethanol, 2-(2-butoxyethoxy)ethanol, or the like, or combinations thereof.

Additional solvents or co-solvents may include aliphatic hydrocarbons, aromatic compounds, halogenated hydrocarbons, ketone solvents, esters, aldehydes, or ethers. Illustrative aliphatic hydrocarbons that can be utilized as the one or more organic solvents can be or include, but are not limited to, n-pentane, n-hexane, n-octane, n-nonane, n-decane, or homologues thereof, 2,2,4-trimethyl pentane, cyclohexane, or the like, or any combination thereof.

Illustrative aromatic compounds that can be utilized as the one or more organic solvents can be or include, but are not limited to benzene, toluene, ethylbenzene, xylene, tetralin, hexafluoro xylene, or the like, or any combination thereof.

Illustrative halogenated hydrocarbons that can be utilized as the one or more organic solvents can be or include, but are not limited to, chloroform, trichloro ethylene, dichloromethane, or the like, or combinations thereof.

Illustrative ketone solvents can be or include, but are not limited to, acetone, methyl ethyl ketone (MEK), diethyl ketone, methyl propyl ketone (MPK), dipropyl ketone, methyl isobutyl ketone (MIBK), cyclopentanone, cyclohexanone, methyl amyl ketone, n-methyl-2-pyrrolidone, diisobutyl ketone, acetophenone, or the like, or combinations thereof.

Illustrative esters that can be utilized as the one or more organic solvents can be or include, but are not limited to, methyl acetate, ethyl acetate, isopropyl acetate, n-butyl acetate, cellosolve acetate, or the like, or combinations thereof.

Illustrative aldehydes that can be utilized as the one or more organic solvents can be or include, but are not limited to, furfuraldehyde, or the like.

Illustrative ethers that can be utilized as the one or more organic solvents can be or include, but are not limited to, diethyl ether, diisopropyl ether, dibutyl ether, methyl tert butyl ether, 1,4-dioxane, tetrahydrofuran, oligomers of perfluoropolyethers, such as the GALDEN® line, which is commercially available from Solvay of Houston, TX, or the like, or combinations thereof.

The amount of the one or more co-solvents present in the antimicrobial coating composition can be from about 0.1% to about 30 weight %, based on a total weight of the antimicrobial coating composition. For example, the amount of the one or more co-solvents present in a antimicrobial coating composition can be from about 1 weight %, about 2 weight %, about 5 weight % or about 10 weight % to about 15 weight %, about 20 weight %, or about 25 weight %, based on a total weight of the antimicrobial coating composition.

The antimicrobial coating composition can include one or more catalysts. As used herein, the term "catalyst" can refer to any component, compound, or substance that can increase the rate of a chemical reaction related to antimicrobial coating crosslinking or hydrolysis, without necessarily undergoing a permanent chemical change. The catalyst used in a preparation of or a formulation of an antimicrobial coating composition can be or include, but is not limited to, an acidic catalyst or a basic catalyst. An illustrative example of an acidic catalyst may include acetic acid. An illustrative example of a basic catalyst may include ammonium hydroxide.

The catalyst can be or include, but is not limited to any number of commonly known acids or bases. Illustrative examples of acids include boric acid, carbonic acid, hydrochloric acid, citric acid, sulfuric acid, phosphoric acid, oxalic acid, nitric acid, hydrofluoric acid, or a combination thereof. Illustrative examples of bases include potassium hydroxide, sodium hydroxide, calcium hydroxide, or a combination thereof.

The one or more catalysts can be present in an amount of from about 0.1 weight % to about 10 weight %, based on a total weight of the antimicrobial coating composition. For example, the one or more catalysts can be present in an amount of from about 0.1 weight %, about 0.5 weight %, about 1 weight %, about 1.5 weight %, about 2 weight %, about 3 weight %, about 4 weight %, or about 5 weight % to about 6 weight %, about 6.5 weight %, about 7 weight %, about 8 weight %, about 9 weight %, or about 10 weight %, based on a total weight of the antimicrobial coating composition. In another example, the one or more catalysts can be present in the antimicrobial coating composition in an amount of from about 0.1 weight % to about 5 weight %, about 0.5 weight % to about 2.5 weight %, or about 0.5 weight % to about 1.0 weight %.

The antimicrobial coating composition can include one or more optional functional additives capable of or configured to provide additional functional properties to the antimicrobial coating composition. The one or more optional functional additives can be or include, but are not limited to, one or more indicators (e.g., visual indicators). Examples of optional functional additives referred to herein are discussed further below. The optional functional additives may be combined with the antimicrobial coating composition to add one or more functionalities alone or in combination with other additives for further functionalities. Functional additives may be incorporated chemically into one or more of the other described additives as disclosed herein, the antimicrobial polymer, or may be added separately to the antimicrobial coating formulation. For example, the antimicrobial polymer may have a fluorescent marker attached to it, which allows it to be detected with a UV light source.

The one or more indicators or visual indicators can be capable of or configured to facilitate, promote, or provide identification of an area or surface treated with the adhesion promoter composition. For example, the visual indicators can be capable of or configured to allow a user to identify what surfaces or areas have been treated by the antimicrobial coating composition in varying environments (e.g., low light, confined space, etc.). The one or more indicators can be or include, but are not limited to, one or more dyes, pigments, ultraviolet (UV) indicators, or the like, or combinations thereof. The one or more indicators can be visible in the visible spectrum (wavelength of 380 nm to 700 nm), the UV spectrum (wavelength of 10 nm to 380 nm), or combinations thereof. The one or more indicators can absorb in the UV spectrum and emit in the visible spectrum. Said in another way, the visual indicator can absorb energy in the ultraviolet spectrum, and the visual indicator can emit energy in the visible spectrum. The one or more indicators can include one or more fluorescent compounds, phosphorescent compounds, or combinations thereof.

Illustrative indicators can be or include, but are not limited to, a proprietary blend of Chromate(2-), [4-[(5-chloro-2-hydroxy-3-nitrophenyl)azo]-2,4-dihydro-5-methyl-2-phenyl-3H-pyrazol-3-onato(2-)][3-[[1-(3-chlorophenyl)-4,5-dihydro-3-methyl-5-oxo-1H-pyrazol-4-yl]azo]-4-hydroxy-5-nitrobenzenesulfonato(3-)]-, disodium, 1-methoxy-2-propanol, 1,2-propanediol, and 2-methoxypropanol, a crimson red solvent based red liquid dye commercially available from KEDA™ Dye of Manitowoc, WI, Triple Glow Powder commercially available from GLONATION of Falmouth, KY, or the like, or combinations thereof. Illustrative types of indicators include chemicals such as conjugated organic dyes, food coloring additives, pH indicators, fluorescent dyes, pigments, colored nanoparticles, and the like. Any of these could be added to the formulation to improve the ability of the coating to be detected. Alternatively, fluorescent tags directly bound to the polymer, such as a coumarin dye, for example, that fluoresces under UV illumination only would serve to prevent unwanted appearance of a dye when not under UV illumination.

The one or more indicators can be present in an amount of from about 0.01 weight % to about 5 weight %, based on a total weight of the antimicrobial coating composition. For example, the one or more indicators can be present in an amount of from about 0.01 weight %, about 0.05 weight %, about 0.1 weight %, about 0.5 weight %, about 1 weight %, about 2 weight %, or about 2.5 weight % to about 3 weight %, about 3.5 weight %, about 4 weight %, about 4.5 weight %, or about 5 weight %, based on a total weight of the antimicrobial coating composition. In another example, the one or more indicators can be present in an amount of from about 0.01 weight % to about 5 weight %, about 2 weight % to about 4 weight %, or about 3 weight % to about 3.5 weight %, based on a total weight of the antimicrobial coating composition.

The antimicrobial coating composition can include one or more solvents. As used herein, the term "solvent" can refer to any component, compound, or substance that can dissolve a solute, additive, component, polymer, or other component of the antimicrobial coating formulation. The solvent used in a preparation of or a formulation of an antimicrobial coating composition can be or include, but is not limited to, water or a water-based solvent. In certain aspects, a solvent may include lower alcohols and glycol ethers, which may alternately be considered as co-solvents, as defined previously, the purpose of which may be to improve wettability of the antimicrobial coating formulation and/or modify drying time of the antimicrobial coating formulation as desired.

The amount of the one or more solvents present in the antimicrobial coating composition can be from about 5% to about 99 weight %, based on a total weight of the antimicrobial coating composition. For example, the amount of the one or more co-solvents present in a antimicrobial coating composition can be from about 5 weight %, about 10 weight %, about 20 weight % or about 30 weight % to about 50 weight %, about 75 weight %, or about 90 weight %, based on a total weight of the antimicrobial coating composition.

FIG. 1 illustrates a schematic view of a vehicle 100, according to an implementation. As shown, the vehicle 100 may include an airplane. The vehicle 100 may also or instead include other types of aircrafts such as helicopters, unmanned aerial vehicles (UAVs), spacecrafts, or the like. In other implementations, the vehicle 100 may be or include a car, a boat, a train, or the like. In yet other implementations, the system and method described below may not be implemented in a vehicle, and rather may be implemented in a building.

The vehicle 100 may include one or more lavatories (one is shown: 110). The lavatory 110 may include a sink 112, a toilet 114, and a sensor 116. The sensor 116 may sense/determine whether the lavatory 110 is occupied (e.g., by a passenger) or unoccupied. For example, the sensor 116 may be or include a motion sensor. The vehicle 100 may also include one or more kitchens or galleys (one is shown: 120). The kitchen 120 may include a sink 122, a dishwasher 124, and an ice maker 126. Additional interior features of the vehicle 100 are described in regard to FIGS. 2A-2C.

Figure 2A:
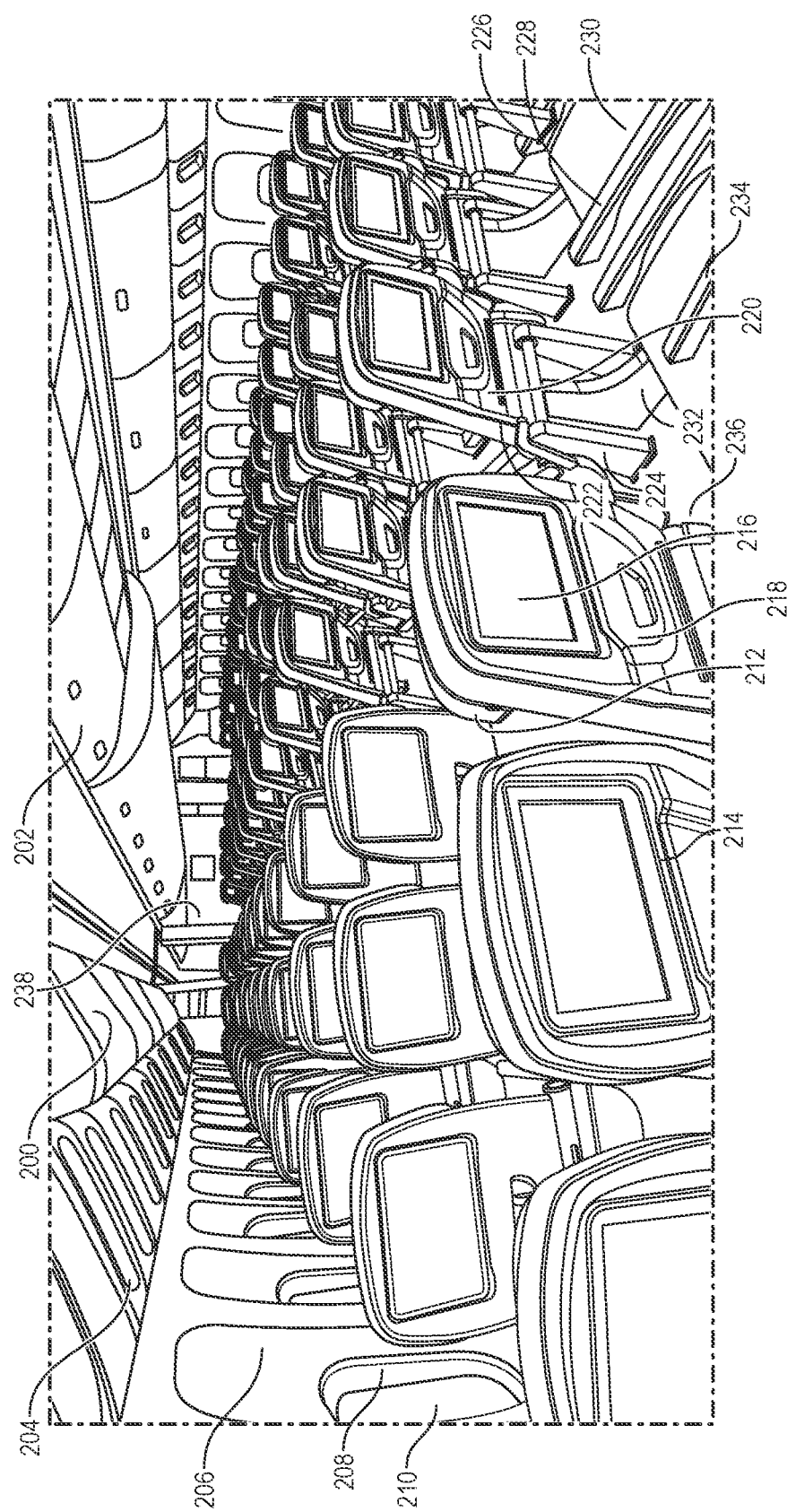
FIGS. 2A-2C illustrate interior application surfaces of a commercial aircraft suitable for coating with an antimicrobial coating composition, in accordance with the present disclosure.
Figure 2B:
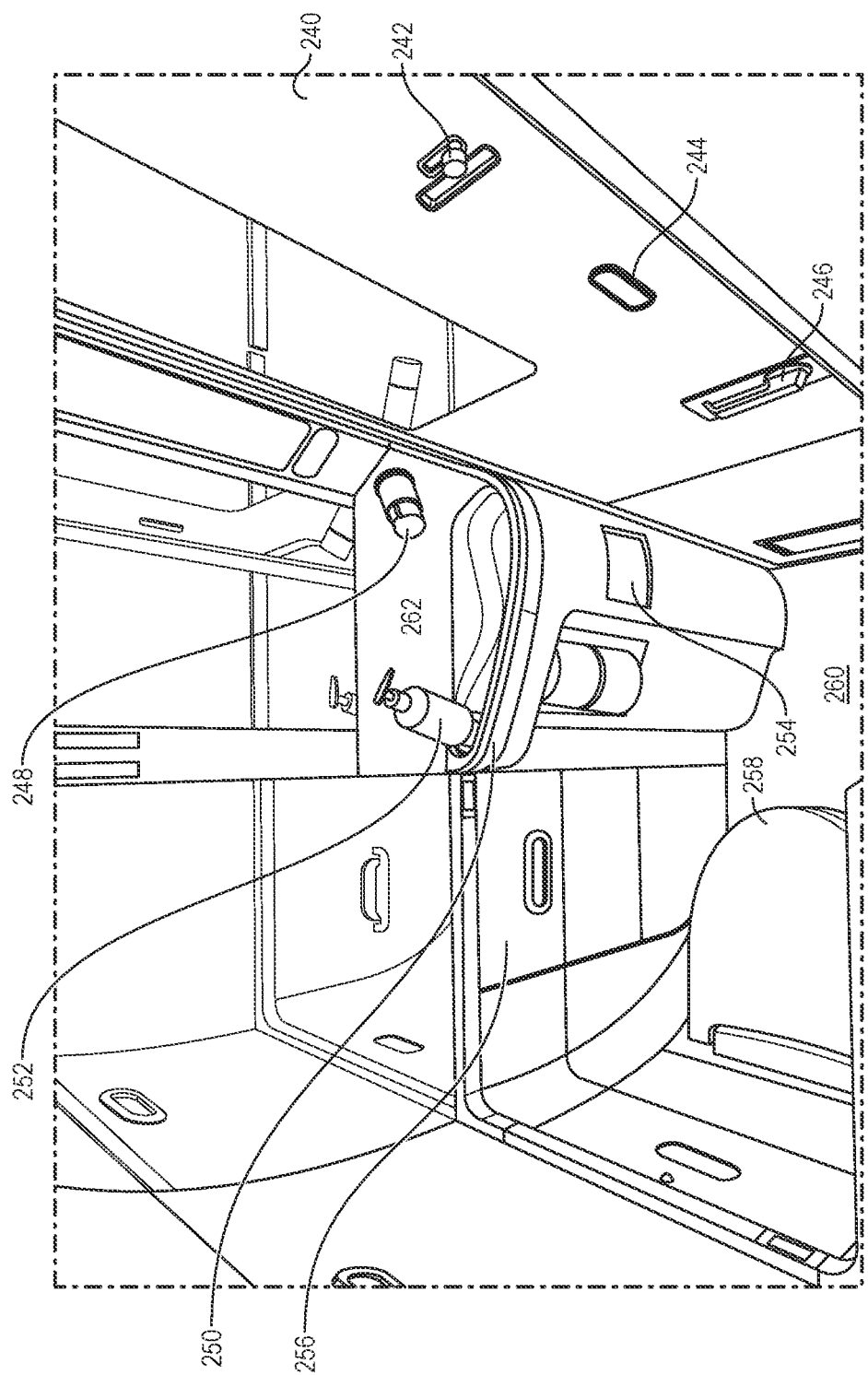
Figure 2C:
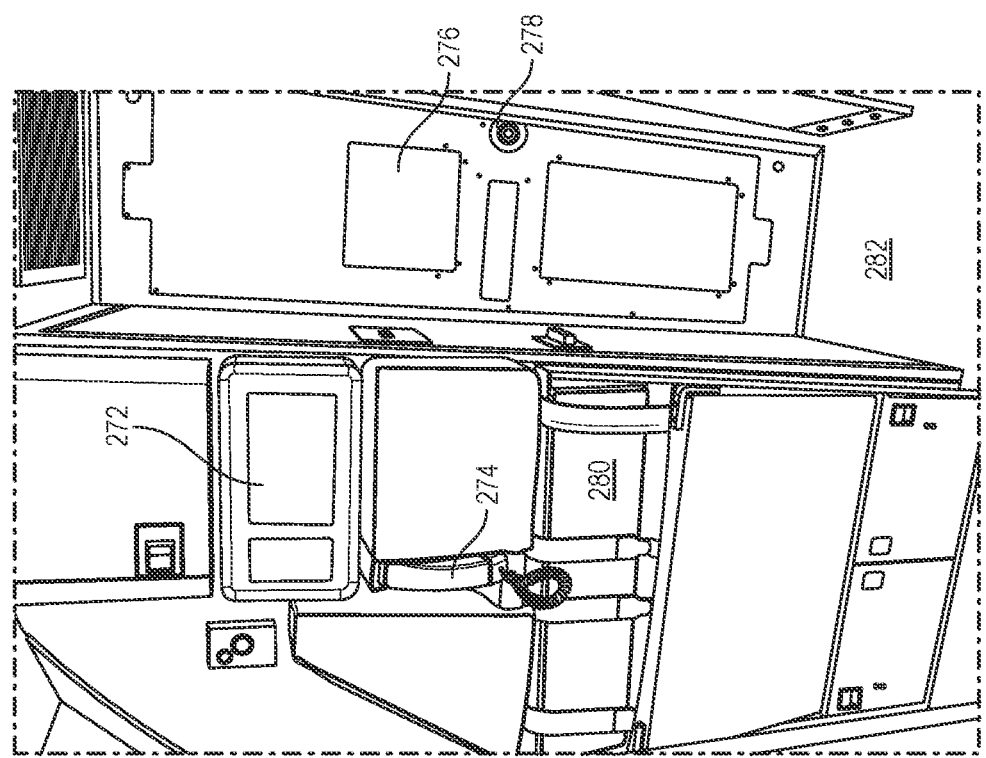
Figure 2C:
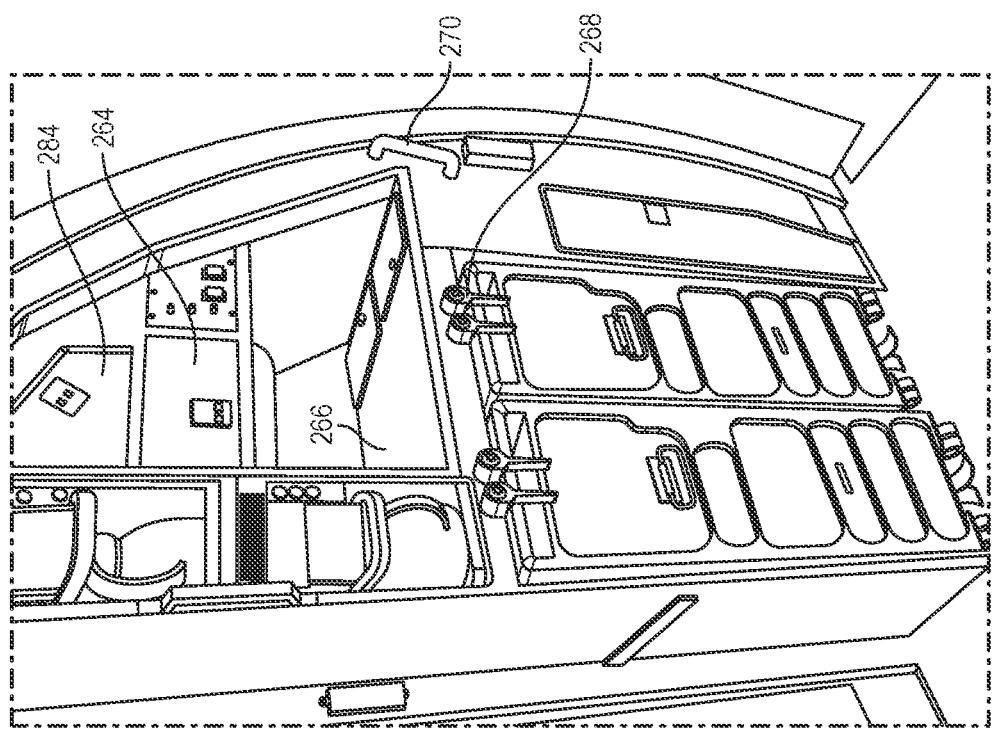

FIGS. 2A-2C illustrate interior application surfaces of a commercial aircraft suitable for coating with an antimicrobial coating composition, in accordance with the present disclosure. FIG. 2A illustrates an interior view of a vehicle, in this case, an aircraft cabin having a variety of high-touch surfaces or features where the application of an antimicrobial coating formulation may be applicable. Indicated in FIG. 2A are a stowbin 200, a stowbin latch 202, a passenger service unit 204 including personal lighting and ventilation services and controls. Also visible are a sidewall panel 206, window shade 208, and window lens 210 located behind the window shade 208. Components of passenger seats which may include applicable surfaces for an antimicrobial coating include seat fabric 212, which may be a synthetic fabric or natural fiber based fabric, such as leather, a seat back 214, an in-flight entertainment (IFE) screen 216, a tray table latch 218, IFE controls 220, a tray table 222, a seat back pocket 224, an arm rest cap 226, a recline button 228, an arm rest 230, a seat belt buckle 232, a seat belt 234, a carpeting or floor mat 236, and a partition 238.

FIG. 2B illustrates an interior view of a vehicle, in this case, an aircraft lavatory or restroom having a variety of high-touch surfaces or features where the application of an antimicrobial coating formulation may be applicable. Shown in FIG. 2B is a lavatory door 240 having a lavatory lock latch 242, a retractable coat hanger 244, and a lavatory door handle 246. Also shown is a faucet or faucet handle 248 over a sink basin 250 with a nearby soap dispenser 252, and paper towel waste flap 254. Also shown in the lavatory is a diaper change table 256, a toilet seat and toilet seat lid 258, a lavatory floor mat 260, and a counter surface 262, all of which are surfaces or touch points which may encounter passengers or crew or biological material from passengers or crew containing viral components or microbes and therefore may benefit from application or coating with an antimicrobial coating formulation as described herein.

FIG. 2C illustrates an interior view of a vehicle, in this case, an aircraft galley and another interior area of the forward section of an aircraft having a variety of high-touch surfaces or features where the application of an antimicrobial coating formulation may be applicable. Shown is a galley stowage bin 284, a first food preparation surface 264, a second food preparation surface 266, a galley cart containment latch 268, and a nearby accessibility handle 270. Also shown is a flight attendant control screen 272, a crew communication and PA phone 274, a flight deck door handle 276, a flight deck door handle 278, a flight attendant jump seat 280, and a galley floor mat 282. Other surfaces or touch points which may encounter passengers or crew or biological material from passengers or crew containing viral components or microbes are also shown or may otherwise be known to those skilled in the art.

Methods

Figure 3:
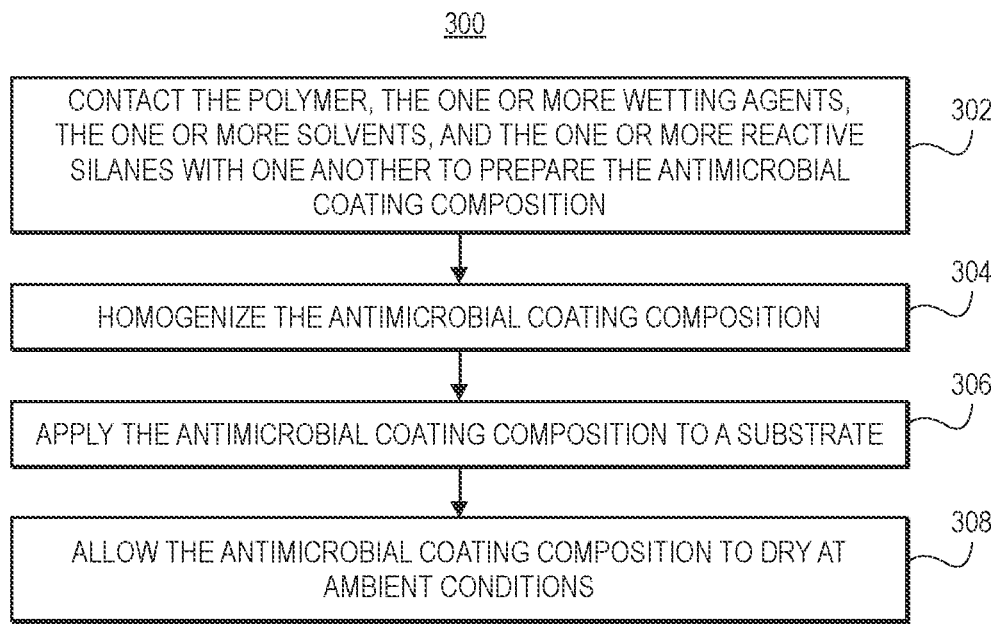
FIG. 3 is a flowchart illustrating a method of applying an antimicrobial coating composition, in accordance with the present disclosure.

FIG. 3 is a flowchart illustrating a method of applying an antimicrobial coating composition, in accordance with the present disclosure. Methods for preparing any one or more of the antimicrobial coating compositions disclosed herein are provided. The method for applying the antimicrobial coating composition 300 can include contacting the polymer, the one or more wetting agents, the one or more solvents, and the one or more reactive silanes with one another to prepare the antimicrobial coating composition 302 as a mixture, homogenizing the antimicrobial coating composition 304, applying the antimicrobial coating composition to a substrate 306, and allowing the antimicrobial coating composition to dry at ambient conditions 308.

It should be appreciated that the order of mixing or contacting each of the components of the antimicrobial coating composition can be at least partially determined by the specific components selected. The method for applying the antimicrobial coating composition 300 can also include purging the mixture with nitrogen to remove dissolved oxygen. The method for applying the antimicrobial coating composition 300 may include pausing after homogenizing the antimicrobial coating composition to allow the antimicrobial coating composition time to pre-react in solution. The method for applying the antimicrobial coating composition 300 may include, but are not limited to, where the substrate is aluminum, a polymer, stainless steel, other commonly used surface metals, or a combination thereof. It should be noted that the step of allowing the antimicrobial coating composition to dry at ambient conditions 308 may be for a period of from about 5 seconds (sec), about 10 sec, about 30 sec, or about 1 min to about 2 min, about 3 min, about 5 min, about 10 min, about 30 min, 60 min, or greater.

The method can further include combining, mixing, blending, or otherwise contacting the mixture with one or more of a functional additive, catalyst, surfactant, co-solvent, or any additional component of an antimicrobial coating composition as described herein. It should be appreciated that the steps of the method for applying the antimicrobial coating composition 300 may be conducted in alternate order depending on the specific nature of the application or substrate to which the antimicrobial coating formulation is applied.

The method for applying the antimicrobial coating composition 300 may include an initial step of reconstituting an antimicrobial polymer, originally a dry powder, by contacting the antimicrobial powder with a solvent, such as water. Next, a wetting agent as described herein may be added to the antimicrobial polymer solution may be executed. Next an adhesion promoter, or reactive silane and an optional catalyst may be added to the antimicrobial polymer coating formulation. The reactive silanes may then be allowed to pre-react in solution over an approximate time frame of approximately 10 min-60 min, or greater. Then the antimicrobial coating composition is applied to a desired substrate or surface, and the coating is allowed to dry at ambient conditions, which may be understood to mean temperatures between 50° F. and 100° F. and humidity levels between 0 and 95% relative humidity. The antimicrobial coating composition may then be allowed to dry over an approximate time frame of approximately 1 min-60 min, or greater.

Figure 4:
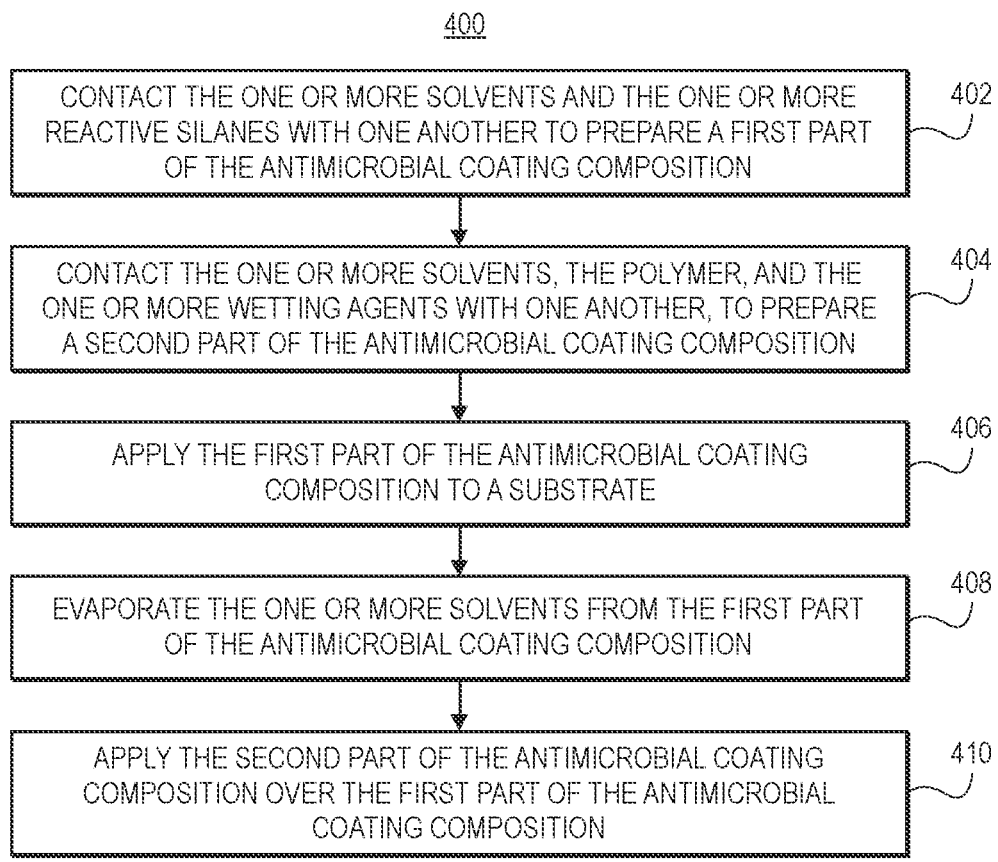
FIG. 4 is a flowchart illustrating a method of applying an antimicrobial coating composition, in accordance with the present disclosure.

FIG. 4 is a flowchart illustrating a method of applying an antimicrobial coating composition, in accordance with the present disclosure. A method for applying any one or more of the antimicrobial coating compositions disclosed herein 400 includes contacting the one or more solvents and the one or more reactive silanes with one another to prepare a first part of the antimicrobial coating composition 402, contacting the one or more solvents, the polymer, and the one or more wetting agents with one another, to prepare a second part of the antimicrobial coating composition 404, applying the first part of the antimicrobial coating composition to a substrate 406, evaporating the one or more solvents from the first part of the antimicrobial coating composition 408, and applying the second part of the antimicrobial coating composition over the first part of the antimicrobial coating composition 410. In certain examples of the method for applying any one or more of the antimicrobial coating compositions disclosed herein 400 a solution of one or more reactive silanes, an optional catalyst, and water is prepared. The reactive silanes may then be allowed to pre-react in solution over an approximate time frame of approximately 10 min-60 min, or greater. This initial preparation of the reactive silane, or adhesive promoter may be applied to a desired surface or substrate. In a separate preparation, the antimicrobial polymer may be reconstituted and/or dissolved in solvent, such as water. A wetting agent, such as a surfactant, co-solvent, or combination thereof, is added to the polymer solution. This second preparation may be applied to the surface or substrate to which the adhesion promoter or reactive silane solution had been applied. Then the antimicrobial coating composition is allowed to dry at ambient conditions. The antimicrobial coating composition may then be allowed to dry over an approximate time frame of approximately 10 min-60 min, or greater.

Methods for applying the antimicrobial coating composition may include steps where the coating composition can be homogenized, for example, in a centrifugal mixer, in the presence of one or more particles. Illustrative particles can be or include, but are not limited to, one or more glass particles, ceramic particles, or the like, or any combination thereof. The method can further include separating the one or more particles and/or relatively larger polymer agglomerations from the antimicrobial coating composition after homogenization. For example, the method can include separating the particles and/or relatively larger polymer agglomerations from the antimicrobial coating composition via filtration. Filtration can include passing the antimicrobial coating composition including the one or more particles (e.g., glass particles) and/or the relatively larger polymer agglomerations through a filter having a pore size less than about 1 mm, less than about 0.5 mm, less than about 0.25 mm, or less than about 0.1 mm.

Methods for utilizing any one or more of the antimicrobial coating compositions disclosed herein to apply to a surface are provided. The surface can be, but is not limited to, any surface or substrate within a vehicle, such as an airplane interior to be treated with an antimicrobial coating composition. Surfaces may include but are not limited to those mentioned in regard to FIG. 2A-2C, or anodized metals, such as aluminum or titanium, carbon fiber composites, carbon fiber reinforced composites, thermoplastics, or combinations thereof. For example, the surface can be a surface of a high-contact area of a structure, support column, construction object, building, vehicle, such as an atmospheric vehicle, aircraft, bus, train, an aerospace vehicle, an unmanned vehicle, an aircraft, a spacecraft, a satellite, a rocket, a missile, or the like, or any components thereof. These substrates or surfaces may include a metal, an alloy of one or more metals, a polymer, copolymer, polymer composite, or combination thereof.

The method for utilizing the antimicrobial coating composition to coat or treat the surface can include applying or contacting the antimicrobial coating composition with the surface. The antimicrobial coating composition can be contacted with the surface via a brush, a roller, an extrusion gun, a spray gun, misting spray, wiping, either by wetting a wiper with a solution of coating or by applying with one or more pre-saturated wipers at a point of use, or the like, or any combination thereof. The antimicrobial coating composition disclosed herein is capable of or configured to concurrently or simultaneously clean the surface, thereby requiring no mechanical processing of the substrate and effectively eliminating additional or optional steps in conventional methods of preparing the surface for the application of an antimicrobial coating composition. Alternatively, substrate cleaning with one or more solvents, surfactants, degreasers, or a combination thereof may be used to prepare the surface. The method for utilizing the antimicrobial coating composition to treat the surface can include evaporating the one or more solvents of the antimicrobial coating composition. The method can further include pausing after applying the antimicrobial coating composition to the substrate to allow the antimicrobial coating composition time to react with the substrate.

EXAMPLES

The examples and other implementations described herein are exemplary and not intended to be limiting in describing the full scope of compositions and methods of this disclosure. Equivalent changes, modifications and variations of specific implementations, materials, compositions and methods can be made within the scope of the present disclosure, with substantially similar results.

Quantization of Polymer Density after Application, and after Abrasive Wiping

Several exemplary antimicrobial coating compositions were prepared using various combinations and compositions and applied to various substrates as described in Table 4, Table 5, and Table 6 below. The antimicrobial coating compositions were prepared in accordance with the method described previously in regard to FIG. 2. Specifically, polymer P13-CA, obtained from University of Queensland, Boeing SDS number 305063 was reconstituted in water, in an approximate concentration of 5% by weight of the total weight of coating formulation. Adhesion promoter, or reactive silanes were added in an amount of 5% by weight of the total weight of coating formulation, with the type of adhesion promoter as indicated in the tables. Absence or presence of a catalyst, in an amount of 0.01 to about 0.1% by weight of the total weight of coating formulation.

TABLE 4

Antimicrobial Coating Composition Formulations as applied to an Aluminum Substrate

| Set | Substrate | Adhesion promoter | Unwiped (g/m$^2$) | Wiped (g/m$^2$) | Percent reduction |
|---|---|---|---|---|---|
| A | Aluminum | None | 0.149 | 0.011 | 92.2 |
| B | | GPTMS | 0.223 | 0.104 | 53.2 |
| C | | GPTMS + acid | 0.242 | 0.184 | 24.1 |
| D | | GPTMS + base | 0.188 | 0.166 | 12.1 |
| E | | TESPMA | 0.115 | 0.034 | 70.0 |
| F | | TESPMA + acid | 0.084 | 0.026 | 68.6 |
| G | | TESPMA + base | 0.101 | 0.020 | 80.4 |
| H | | AP-1 | 0.136 | 0.017 | 87.7 |
| J | | AP-1 (part A only) | 0.150 | 0.022 | 85.8 |
| K | | TiTEAP | 0.555 | 0.138 | 75.0 |
| L | | PAA-co-PBA | 0.118 | 0.012 | 89.7 |

TABLE 5

Antimicrobial Coating Composition Formulations as applied to a Kydex® Substrate

| Set | Substrate | Adhesion promoter | Unwiped (g/m$^2$) | Wiped (g/m$^2$) | Percent reduction |
|---|---|---|---|---|---|
| A | Kydex | None | 0.153 | 0.093 | 39.7 |
| B | | GPTMS | 0.150 | 0.155 | −3.3 |
| C | | GPTMS + acid | 0.189 | 0.223 | −17.8 |
| D | | GPTMS + base | 0.149 | 0.163 | −9.7 |
| E | | TESPMA | 0.158 | 0.113 | 28.2 |
| F | | TESPMA + acid | 0.167 | 0.129 | 23.1 |
| G | | TESPMA + base | 0.180 | 0.140 | 21.9 |
| H | | AP-1 | 0.158 | 0.126 | 20.5 |
| J | | AP-1 (part A only) | 0.271 | 0.119 | 56.2 |
| K | | TiTEAP | 0.732 | 0.330 | 54.9 |
| L | | PAA-co-PBA | 0.217 | 0.215 | 0.2 |

TABLE 6

Antimicrobial Coating Composition Formulations as applied to a Polycarbonate Substrate

| Set | Substrate | Adhesion promoter | Unwiped (g/m$^2$) | Wiped (g/m$^2$) | Percent reduction |
|---|---|---|---|---|---|
| A | BMS8-251 | None | 1.045 | 0.732 | 30.0 |
| B | | GPTMS | 1.065 | 0.820 | 22.9 |
| C | | GPTMS + acid | 1.328 | 0.924 | 30.5 |
| D | | GPTMS + base | 1.352 | 1.043 | 22.8 |
| E | | TESPMA | 1.025 | 0.803 | 21.7 |
| F | | TESPMA + acid | 1.858 | 1.288 | 30.7 |
| G | | TESPMA + base | 1.583 | 1.197 | 24.4 |
| H | | AP-1 | 1.246 | 0.973 | 21.9 |
| J | | AP-1 (part A only) | 6.110 | 4.066 | 33.5 |
| K | | TiTEAP | 10.714 | 4.614 | 56.9 |
| L | | PAA-co-PBA | 1.618 | 1.071 | 33.8 |

Definitions and notes related to the formulations listed in Table 4, Table 5, and Table 6 include the following: TESPMA—Triethoxysilylpropylmaleamic acid; TiTEAP—Titanium (triethanolaminato)isopropoxide; AP-1—a mixture developed by Boeing and licensed to Zip-Chem to produce; it includes zirconium tetrapropoxide (active ingredient) as well as solvents and wetting agents. PAAcoPBA refers to a polyacrylic acid-co-polybutyl acrylate polymer. BMS8-251—is a polycarbonate material used in typical commercial aerospace applications. Polycarbonates such as BMS8-251 may be used as materials in the fabrication of window shades, lenses, arm rest materials, coverings, panel faces, windows, or other surfaces. Kydex® is a thermoplastic acrylic-polyvinyl chloride material, which is an example material used in the fabrication of tray tables and seat backs, for example. Shaded boxes worked the best. Acid refers to acetic acid, base refers to ammonium hydroxide.

In general, the results shown in the tables demonstrate the coating formulations are applicable to both metal and plastic surfaces and demonstrate sufficient durability and adhesion to the respective substrates. GPTMS also appears to compare favorably to other candidates, in terms of being one of the more effective additives to the antimicrobial coating formulation. Quantitative data related to wetting of the various formulations proved difficult to capture. However, when photographic evidence was acquired using flashlight illumination positioned nearly parallel with the test coupon substrates to illuminate droplets on the surface, it was observed that the coating drops produce hazy appearance in the illuminated area of the coupons. It may be noted that lower haziness is associated with the coating droplets lying flatter, indicative of improved surface coverage. In substrate coupons where polymer is applied with wetting agents, the coating show less haziness as described. This is also demonstrable on the plastic substrates as well as metal, but it is difficult to obtain quantitative images of this phenomenon.

Antimicrobial Coating Application Method

Each of the substrates listed in the example were prepared by wiping the surface with isopropyl alcohol using a lint-free wipe to remove any particulates or residue.

Coating deposition: Approximately 2 mL of an antimicrobial coating composition as noted in the above tables was transferred onto the surface of the prepared substrate using a high volume low pressure (HVLP) spray application. Enough solution was applied to cover the surface completely. The solution was allowed to react under ambient conditions for 15 minutes.

Quantization of coating retention calculated by UV intensity of photos measured under ultraviolet illumination: Calibration was conducted by using known concentrations of the polymer in water as a solvent. Serial dilutions were conducted while measuring droplet size, brightness, and establishing a calibration curve to determine amount of polymer present in an application. Photos of the substrate coupons were taken and analyzed to measure amount of material based on the brightness vs. concentration calibration curve. A wipe durability test was completed, and the samples were re-measured. Measurements were taken of average brightness in a wiped area of the coated substrate and an un-wiped area of the coated substrate. Next, a calculated % change was determined according to the following equation: [1−(brightness un-wiped)/(brightness wiped)]*100%. Thus, the calculated approximate polymer coverage in $g/m^2$ was determined from calibrated coupons with known deposited mass. It was noted that wiped areas with minimal change are better, as observed by brightness before and after wiping.

It should be noted that some negative numbers were collected and may indicate some of the surface polymer may have been redeposited during wiping, or alternatively it could be noise related. As reported in the above tables, lower numbers show improved durability and adhesion of the coating formulation, even accounting for some minor uncertainty associated with negative numbers.

The preceding description of various aspect(s) is merely exemplary in nature and is in no way intended to limit the disclosure, its application, or uses.

As used throughout this disclosure, ranges are used as shorthand for describing each and every value that is within the range. It should be appreciated and understood that the description in a range format is merely for convenience and brevity, and should not be construed as an inflexible limitation on the scope of any examples or implementations disclosed herein. Accordingly, the disclosed range should be construed to have specifically disclosed all the possible subranges as well as individual numerical values within that range. As such, any value within the range can be selected as the terminus of the range. For example, description of a range such as from 1 to 5 should be considered to have specifically disclosed subranges such as from 1.5 to 3, from 1 to 4.5, from 2 to 5, from 3.1 to 5, etc., as well as individual numbers within that range, for example, 1, 2, 3, 3.2, 4, 5, etc. This applies regardless of the breadth of the range.

Unless otherwise specified, all percentages and amounts expressed herein and elsewhere in the specification should be understood to refer to percentages by weight of total solids. The amounts given are based on the active weight of the material.

Additionally, all numerical values are "about" or "approximately" the indicated value, and take into account experimental error and variations that would be expected by a person having ordinary skill in the art. It should be appreciated that all numerical values and ranges disclosed herein are approximate values and ranges, whether "about" is used in conjunction therewith. It should also be appreciated that the term "about," as used herein, in conjunction with a numeral refers to a value that can be ±0.01% (inclusive), ±0.1% (inclusive), ±0.5% (inclusive), ±1% (inclusive) of that numeral, ±2% (inclusive) of that numeral, ±3% (inclusive) of that numeral, ±5% (inclusive) of that numeral, ±10% (inclusive) of that numeral, or ±15% (inclusive) of that numeral. It should further be appreciated that when a numerical range is disclosed herein, any numerical value falling within the range is also specifically disclosed.

The present disclosure has been described with reference to exemplary implementations. Although a limited number of implementations have been shown and described, it will be appreciated by those skilled in the art that changes can be made in these implementations without departing from the principles and spirit of the preceding detailed description. It is intended that the present disclosure be construed as including all such modifications and alterations insofar as they come within the scope of the appended claims or the equivalents thereof.

What is claimed is:

1. An antimicrobial coating composition, comprising:
   a polymer comprising a plurality of alkene units and a plurality of macroCTA polymer units;
   one or more reactive silanes;
   one or more wetting agents; and
   one or more solvents.

2. The antimicrobial coating composition of claim 1, wherein the polymer is present in an amount of from about 0.05% to about 10% by total weight of the antimicrobial coating composition.

3. The antimicrobial coating composition of claim 1, wherein the one or more reactive silanes are present in an amount of from about 0.1% to about 10% by total weight of the antimicrobial coating composition.

4. The antimicrobial coating composition of claim 1, wherein the one or more reactive silanes comprises a glycidoxy functional group.

5. The antimicrobial coating composition of claim 4, wherein the one or more reactive silanes comprises glycidoxypropyltrimethoxysilane.

6. The antimicrobial coating composition of claim 1, wherein the one or more reactive silanes comprises an amine functional group.

7. The antimicrobial coating composition of claim 1, wherein the one or more wetting agents comprise a surfactant, a co-solvent or a combination thereof.

8. The antimicrobial coating composition of claim 7, wherein the antimicrobial coating composition further comprises a surfactant that is present in an amount of from about 0.1% to about 2% by total weight of the antimicrobial coating composition.

9. The antimicrobial coating composition of claim 7, wherein the antimicrobial coating composition further comprises a co-solvent that is present in an amount of from about 0.5% to about 20% by total weight of the antimicrobial coating composition.

10. The antimicrobial coating composition of claim 1, further comprising one or more catalysts.

11. The antimicrobial coating composition of claim 10, wherein the one or more catalysts comprises acetic acid.

12. The antimicrobial coating composition of claim 10, wherein the one or more catalysts comprises ammonium hydroxide.

13. The antimicrobial coating composition of claim 1, further comprising one or more functional additives.

14. The antimicrobial coating composition of claim 13, wherein the functional additive comprises a fluorescent marker.

15. The antimicrobial coating composition of claim 1, wherein the solvent comprises water.

16. An antimicrobial coating composition, comprising:
    a polymer comprising a plurality of alkene units and a plurality of macroCTA polymer units;
    one or more reactive silanes comprising a glycidoxypropyltrimethoxysilane;
    ammonium hydroxide;
    one or more wetting agents; and
    water.

17. A method for applying an antimicrobial coating composition, comprising contacting a polymer comprising a plurality of alkene units and a plurality of macroCTA polymer units, one or more wetting agents, one or more solvents, and one or more reactive silanes with one another to prepare an antimicrobial coating composition; homogenizing the antimicrobial coating composition to a substrate; and allowing the antimicrobial coating composition to dry at ambient conditions.

18. The method of claim 17, further comprising pausing after homogenizing the antimicrobial coating composition to allow the antimicrobial coating composition time to pre-react in solution.

19. The method of claim 17, wherein the substrate is metal, alloy, polymer, or combination thereof.

20. A method for applying the antimicrobial coating composition of claim 1, the method comprising:
    contacting the one or more solvents and the one or more reactive silanes with one another to prepare a first part of the antimicrobial coating composition;
    contacting the one or more solvents, the polymer, and the one or more wetting agents with one another, to prepare a second part of the antimicrobial coating composition;
    applying the first part of the antimicrobial coating composition to a substrate;
    evaporating the one or more solvents from the first part of the antimicrobial coating composition; and
    applying the second part of the antimicrobial coating composition over the first part of the antimicrobial coating composition.

* * * * *

SEQUENCE LISTING

```
<160> NUMBER OF SEQ ID NOS: 32

<210> SEQ ID NO 1
<211> LENGTH: 20
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 1

Arg Arg Lys Lys Ala Ala Val Ala Leu Leu Pro Ala Val Leu Leu Ala
1               5                   10                  15

Leu Leu Ala Pro
            20

<210> SEQ ID NO 2
```

```
<211> LENGTH: 13
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 2

Arg Arg Lys Lys Leu Ala Val Leu Leu Ala Leu Leu Ala
1               5                   10

<210> SEQ ID NO 3
<211> LENGTH: 7
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 3

Asn Asp Phe Arg Ser Lys Thr
1               5

<210> SEQ ID NO 4
<211> LENGTH: 9
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 4

Cys Asn Asp Phe Arg Ser Lys Thr Cys
1               5

<210> SEQ ID NO 5
<211> LENGTH: 12
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 5

Trp Leu Val Phe Phe Val Ile Phe Tyr Phe Phe Arg
1               5                   10

<210> SEQ ID NO 6
<211> LENGTH: 12
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 6

Trp Leu Val Phe Phe Val Ile Ala Tyr Phe Ala Arg
1               5                   10

<210> SEQ ID NO 7
<211> LENGTH: 16
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 7
```

```
Trp Leu Val Phe Phe Val Ile Phe Tyr Phe Phe Arg Arg Arg Lys Lys
1               5                   10                  15
```

<210> SEQ ID NO 8
<211> LENGTH: 16
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 8

```
Arg Arg Lys Lys Trp Leu Val Phe Phe Val Ile Phe Tyr Phe Phe Arg
1               5                   10                  15
```

<210> SEQ ID NO 9
<211> LENGTH: 10
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 9

```
Arg Arg Lys Lys Ile Phe Tyr Phe Phe Arg
1               5                   10
```

<210> SEQ ID NO 10
<211> LENGTH: 10
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 10

```
Trp Leu Val Phe Phe Val Arg Arg Lys Lys
1               5                   10
```

<210> SEQ ID NO 11
<211> LENGTH: 10
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 11

```
Phe Phe Val Ile Phe Tyr Arg Arg Lys Lys
1               5                   10
```

<210> SEQ ID NO 12
<211> LENGTH: 15
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: C-term NH2
<220> FEATURE:
<221> NAME/KEY: SITE
<222> LOCATION: (1)..(1)
<223> OTHER INFORMATION: Residue linked to C17H35CO

<400> SEQUENCE: 12

```
Ala Arg Leu Pro Arg Thr Met Val His Pro Lys Pro Ala Gln Pro
1               5                   10                  15
```

```
<210> SEQ ID NO 13
<211> LENGTH: 15
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<221> NAME/KEY: SITE
<222> LOCATION: (1)..(1)
<223> OTHER INFORMATION: Residue linked to C16

<400> SEQUENCE: 13

Ala Arg Leu Pro Arg Thr Met Val His Pro Lys Pro Ala Gln Pro
1               5                   10                  15

<210> SEQ ID NO 14
<211> LENGTH: 8
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<221> NAME/KEY: SITE
<222> LOCATION: (1)..(1)
<223> OTHER INFORMATION: Residue linked to C16

<400> SEQUENCE: 14

Ala Arg Leu Pro Arg Thr Met Val
1               5

<210> SEQ ID NO 15
<211> LENGTH: 5
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<221> NAME/KEY: SITE
<222> LOCATION: (1)..(1)
<223> OTHER INFORMATION: Residue linked to C16

<400> SEQUENCE: 15

Ala Arg Leu Pro Arg
1               5

<210> SEQ ID NO 16
<211> LENGTH: 20
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 16

Gly Cys Lys Lys Tyr Arg Arg Phe Arg Trp Lys Phe Lys Gly Lys Phe
1               5                   10                  15

Trp Phe Trp Gly
            20

<210> SEQ ID NO 17
<211> LENGTH: 19
<212> TYPE: PRT
<213> ORGANISM: Artificial Sequence
<220> FEATURE:
<223> OTHER INFORMATION: Description of Artificial Sequence: Synthetic
      peptide
```

<400> SEQUENCE: 17

Gly Lys Lys Tyr Arg Arg Phe Arg Trp Lys Phe Lys Gly Lys Trp Phe
1               5                   10                  15

Trp Phe Gly

<210> SEQ ID NO 18
<211> LENGTH: 30
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 18

Gly Phe Trp Phe Lys Gly Lys Trp Arg Phe Lys Lys Tyr Arg Gly Gly
1               5                   10                  15

Arg Tyr Lys Lys Phe Arg Trp Lys Gly Lys Phe Trp Phe Gly
                20                  25                  30

<210> SEQ ID NO 19
<211> LENGTH: 15
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 19

Ser Ser Asn Lys Ser Thr Thr Gly Ser Gly Glu Thr Thr Thr Ala
1               5                   10                  15

<210> SEQ ID NO 20
<211> LENGTH: 30
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 20

Ala Cys Tyr Cys Arg Ile Pro Ala Cys Ile Ala Gly Glu Arg Arg Tyr
1               5                   10                  15

Gly Thr Cys Ile Tyr Gln Gly Arg Leu Trp Ala Phe Cys Cys
                20                  25                  30

<210> SEQ ID NO 21
<211> LENGTH: 12
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 21

Ser Lys His Ser Ser Leu Asp Cys Val Leu Arg Pro
1               5                   10

<210> SEQ ID NO 22
<211> LENGTH: 17
<212> TYPE: PRT
<213> ORGANISM: Artificial Sequence
<220> FEATURE:
<223> OTHER INFORMATION: Description of Artificial Sequence: Synthetic
      peptide

```
<400> SEQUENCE: 22

Ala Gly Asp Asp Gln Gly Leu Asp Lys Cys Val Pro Asn Ser Lys Glu
1               5                   10                  15

Lys

<210> SEQ ID NO 23
<211> LENGTH: 11
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 23

Asn Gly Glu Ser Ser Ala Asp Trp Ala Lys Asn
1               5                   10

<210> SEQ ID NO 24
<211> LENGTH: 17
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 24

Leu Phe Arg Leu Ile Lys Ser Leu Ile Lys Arg Leu Val Ser Ala Phe
1               5                   10                  15

Lys

<210> SEQ ID NO 25
<211> LENGTH: 37
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 25

Leu Leu Gly Asp Phe Phe Arg Lys Ser Lys Glu Lys Ile Gly Lys Glu
1               5                   10                  15

Phe Lys Arg Ile Val Gln Arg Ile Lys Asp Phe Leu Arg Asn Leu Val
                20                  25                  30

Pro Arg Thr Glu Ser
            35

<210> SEQ ID NO 26
<211> LENGTH: 25
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 26

Met Asp Val Asn Pro Thr Leu Leu Phe Leu Lys Val Pro Ala Gln Asn
1               5                   10                  15

Ala Ile Ser Thr Thr Phe Pro Tyr Thr
                20                  25

<210> SEQ ID NO 27
<211> LENGTH: 37
<212> TYPE: PRT
<213> ORGANISM: Artificial Sequence
```

```
<220> FEATURE:
<223> OTHER INFORMATION: Description of Artificial Sequence: Synthetic
      polypeptide

<400> SEQUENCE: 27

Met Glu Arg Ile Lys Glu Leu Arg Asp Leu Met Ser Trp Ser Arg Thr
1               5                   10                  15

Arg Glu Ile Leu Thr Lys Thr Thr Val Asp His Met Ala Ile Ile Lys
                20                  25                  30

Lys Tyr Thr Ser Gly
                35

<210> SEQ ID NO 28
<211> LENGTH: 27
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 28

Glu Ser Gly Arg Ile Lys Lys Glu Glu Phe Ala Glu Ile Met Lys Ile
1               5                   10                  15

Cys Ser Thr Ile Glu Glu Leu Gly Arg Gln Lys
                20                  25

<210> SEQ ID NO 29
<211> LENGTH: 15
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 29

Met Asp Val Asn Pro Tyr Leu Leu Phe Leu Lys Val Pro Ala Gln
1               5                   10                  15

<210> SEQ ID NO 30
<211> LENGTH: 10
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 30

Ala Lys Val Thr Met Thr Cys Ser Ala Ser
1               5                   10

<210> SEQ ID NO 31
<211> LENGTH: 29
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 31

Cys Tyr Cys Arg Ile Pro Ala Cys Ile Ala Gly Glu Arg Arg Tyr Gly
1               5                   10                  15

Thr Cys Ile Tyr Gln Gly Arg Leu Trp Ala Phe Cys Cys
                20                  25

<210> SEQ ID NO 32
```

```
<211> LENGTH: 19
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 32

Cys Ala Thr Cys Glu Gln Ile Ala Asp Ser Gln His Arg Ser His Arg
1               5                   10                  15

Gln Met Val
```